United States Patent
Di Girolamo et al.

(10) Patent No.: US 12,402,040 B2
(45) Date of Patent: Aug. 26, 2025

(54) NR V2X MOBILITY

(71) Applicant: InterDigital Patent Holdings, Inc., Wilmington, DE (US)

(72) Inventors: Rocco Di Girolamo, Laval (CA); Pascal M. Adjakple, Great Neck, NY (US); Zhuo Chen, Claymont, DE (US); Qing Li, Princeton Junction, NJ (US); Guodong Zhang, Woodbury, NY (US); Joseph M. Murray, Schwenksville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 565 days.

(21) Appl. No.: 17/637,600

(22) PCT Filed: Aug. 27, 2020

(86) PCT No.: PCT/US2020/048123
§ 371 (c)(1),
(2) Date: Feb. 23, 2022

(87) PCT Pub. No.: WO2021/041619
PCT Pub. Date: Mar. 4, 2021

(65) Prior Publication Data
US 2022/0279393 A1    Sep. 1, 2022

Related U.S. Application Data

(60) Provisional application No. 62/892,327, filed on Aug. 27, 2019.

(51) Int. Cl.
H04W 36/00    (2009.01)
H04W 36/08    (2009.01)
(Continued)

(52) U.S. Cl.
CPC ... *H04W 36/0058* (2018.08); *H04W 36/0072* (2013.01); *H04W 36/0088* (2013.01);
(Continued)

(58) Field of Classification Search
CPC ..... H04L 1/188; H04L 1/1848; H04L 1/1812; H04W 52/0216; H04W 76/28;
(Continued)

(56) References Cited

U.S. PATENT DOCUMENTS

2011/0250892 A1    10/2011    Gupta et al.
2017/0019822 A1    1/2017    Zhao et al.
(Continued)

FOREIGN PATENT DOCUMENTS

| CN | 106465209 A | 2/2017 |
| CN | 109565791 A | 4/2019 |
| EP | 3051737 A1 | 8/2016 |
| WO | 2018084590 A1 | 5/2018 |

OTHER PUBLICATIONS

Fujitsu: "Discussion on Basic Resource Allocation Methods for NR-V2X Si delink Communication", 3GPP Draft; RI-1981946 Discussion on Basic Resource Allocation for NR-V2X Sidelink Communication, 3rd Generation Partnership Project (3GPP), Mobile Competence Centre; 650, Route Des Lucioles; F-8692, vol. RAN WGI, No. Athens, Greece; Feb. 25, 2019-20198381, Feb. 15, 2019, XP051599640, Retrieved from the Internet: URL:http://www.3gpp.org/ftp/tsg%5Fran/WG1%5FRL1/TSGR1%5F96/Docs/R1%2D1981946%2Ezip [retrieved on Feb. 15, 2019].
(Continued)

*Primary Examiner* — Ayanah S George
(74) *Attorney, Agent, or Firm* — Flaster Greenberg P.C.

(57) ABSTRACT

UEs' mobility may have a significant impact on sidelink communications and Uu mobility procedures of UEs participating in SL communication or SL Group Communication. Methods devised to optimize handover procedures, cell
(Continued)

reselection procedures, and transition to RRC_IDLE and RRC_INACTIVE for UEs with ongoing SL communications. Methods are disclosed herein for PLMN selection for UEs requiring sidelink communication or with active sidelink communication, as well as, methods to provide priority-based resource allocation while using exceptional transmit resource pools. Also, provided are SL group management procedures to deal with impacts of UE mobility.

10 Claims, 21 Drawing Sheets

(51) Int. Cl.
  *H04W 72/02* (2009.01)
  *H04W 72/56* (2023.01)
  *H04W 92/18* (2009.01)
(52) U.S. Cl.
  CPC .......... *H04W 72/02* (2013.01); *H04W 72/56* (2023.01); *H04W 36/087* (2023.05); *H04W 92/18* (2013.01)
(58) Field of Classification Search
  CPC ... H04W 72/25; H04W 4/40; H04W 28/0236; H04W 28/04; H04W 92/18; Y02D 30/70
  See application file for complete search history.

(56) References Cited

U.S. PATENT DOCUMENTS

| | | | |
|---|---|---|---|
| 2017/0070924 A1 | 3/2017 | Wu et al. | |
| 2018/0115930 A1 | 4/2018 | Masini et al. | |
| 2019/0104450 A1* | 4/2019 | Adachi | H04W 56/00 |
| 2019/0239112 A1 | 8/2019 | Rao et al. | |
| 2019/0289615 A1 | 9/2019 | Lee et al. | |
| 2020/0204967 A1* | 6/2020 | Futaki | H04W 88/04 |
| 2021/0185578 A1* | 6/2021 | Zhuo | H04W 36/22 |
| 2022/0039082 A1* | 2/2022 | Belleschi | H04W 72/51 |

OTHER PUBLICATIONS

Mediatek (Rapporteur): "Summary of Email discussion for [106#79] [NR/V2X] Exceptional TX resource pool", 3GPP Draft; R2-1911126 Summary of Email Discussion for [106#79] [NRV2X] Exceptional TX Resource Pool, 3rd Generation Partnership Project (3GPP), Mobile Competence Centre; 650, Route Des Lucioles; F-0, vol. RAN WG2, No. Prague, CZ; Aug. 26, 2019-Aug. 30, 2019 Aug. 16, 2019, XP051768888, Retrieved from the Internet: URL:http://www.3gpp.org/ftp/tsg_ran/WG2_RL2/TSGR2_107/Docs/R2-1911126.zip.

3rd Generation Partnership Project; "Priority handling for Sidelink Direct Communication", Qualcomm Incorporated, R2-153729, 3GPP TSG-RAN WG2 Meeting #91 Beijing, China, Aug. 24-28, 2015, 4 pages.

3rd Generation Partnership Project; "Technical Specification Group Radio Access Network; NR; Radio Resource Control (RRC) protocol specification (Release 15)", 3GPP TS 38.331 V15.6.0, Jun. 2019, 519 pages.

3rd Generation Partnership Project; "Technical Specification Group Radio Access Network; NR; User Equipment (UE) procedures in Idle mode and RRC Inactive state (Release 15)", 3GPP TS 38.304 v15.4.0, Jun. 2019, 29 pages.

3rd Generation Partnership Project; "3rd Generation Partnership Project; Technical Specification Group Radio Access Network; NR; Study on NR Vehicle-to-Everything (V2X) (Release 16)", 3GPP TS 38.885 V16.0.0, Mar. 2019, 122 pages.

3rd Generation Partnership Project; "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.6.0, Jun. 2019, 365 pages.

3rd Generation Partnership Project; "Technical Specification Group Radio Access Network; Evolved Universal Terrestrial Radio Access (E-UTRA); Radio Resource Control (RRC); Protocol specification (Release 15)", 3GPP TS 36.331 V15.6.0, Jun. 2019, 960 pages.

3rd Generation Partnership Project; "Support of communication group priority and half duplex resolution", Qualcomm Incorporated, R1-154614, 3GPP TSG-RAN WG1 #82, Aug. 24-28, 2015, Beijing, China, 6 pages.

3rd Generation Partnership Project; "Support of communication group priority and half duplex resolution", Qualcomm Incorporated, R1-154724, 3GPP TSG-RAN WG1 #82, Aug. 24-28, 2015, Beijing, China, 6 pages.

3rd Generation Partnership Project; "Resource Pool Aspects for NR V2X", InterDigital Inc., R2-1909588, 3GPP TSG-RAN WG2 Meeting #107, Prague, Czech Republic,Aug. 26-30, 2019, 5 pages.

* cited by examiner

NR V2X MOBILITY

CROSS-REFERENCE TO RELATED APPLICATIONS

This application is the National Stage Application of International Patent Application No. PCT/US2020/048123, filed Aug. 27, 2020 which claims the benefit of the filing date of U.S. provisional patent application No. 62/892,327, filed Aug. 27, 2019, titled "NR V2X Mobility."

BACKGROUND

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G."

BRIEF DESCRIPTION OF THE DRAWINGS

A more detailed understanding may be had from the following description, given by way of example in conjunction with accompanying drawings wherein.

DETAILED DESCRIPTION

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 1A:
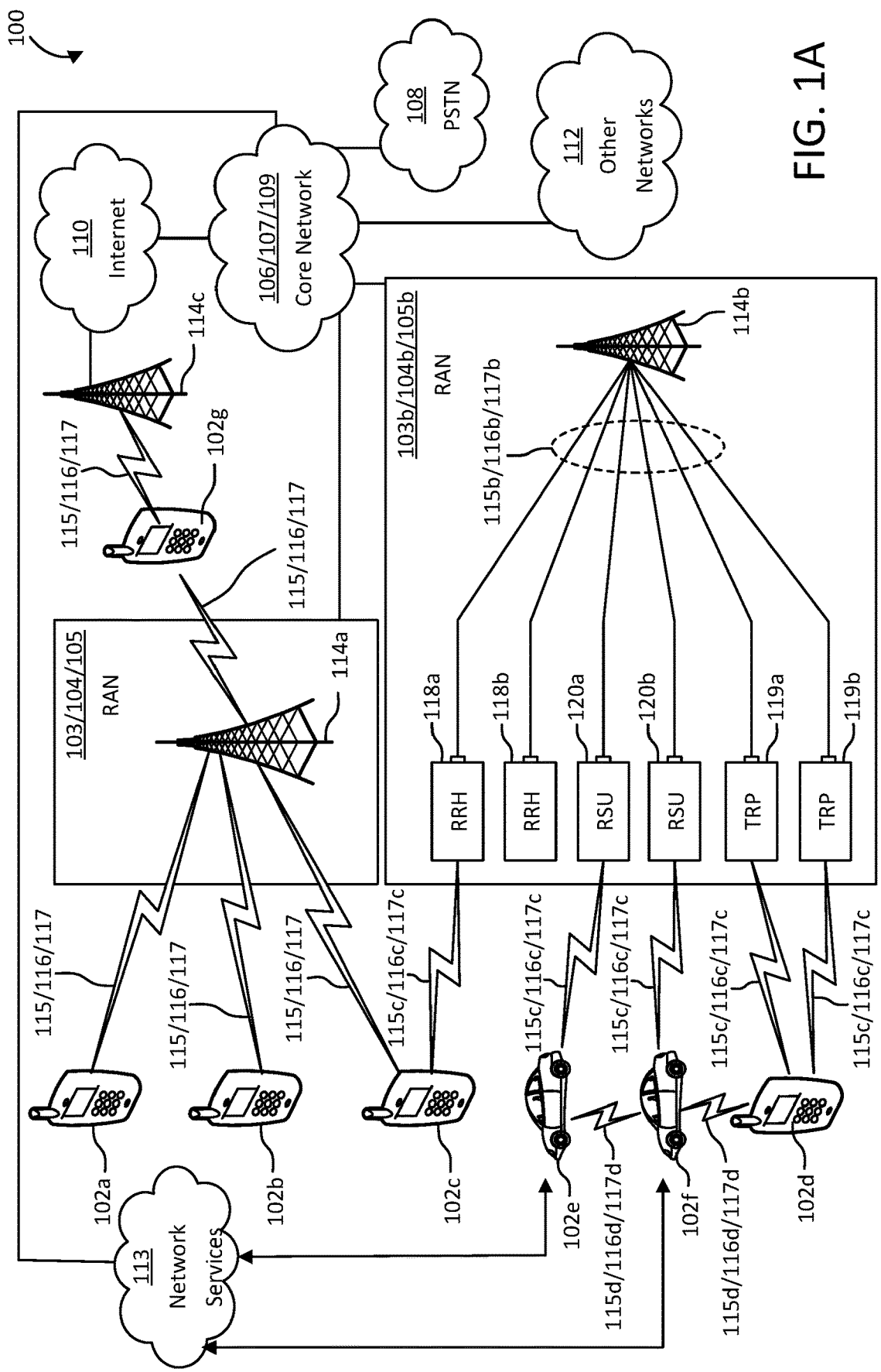
FIG. 1A illustrates an example communications system.

FIG. 1A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 1A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103804/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
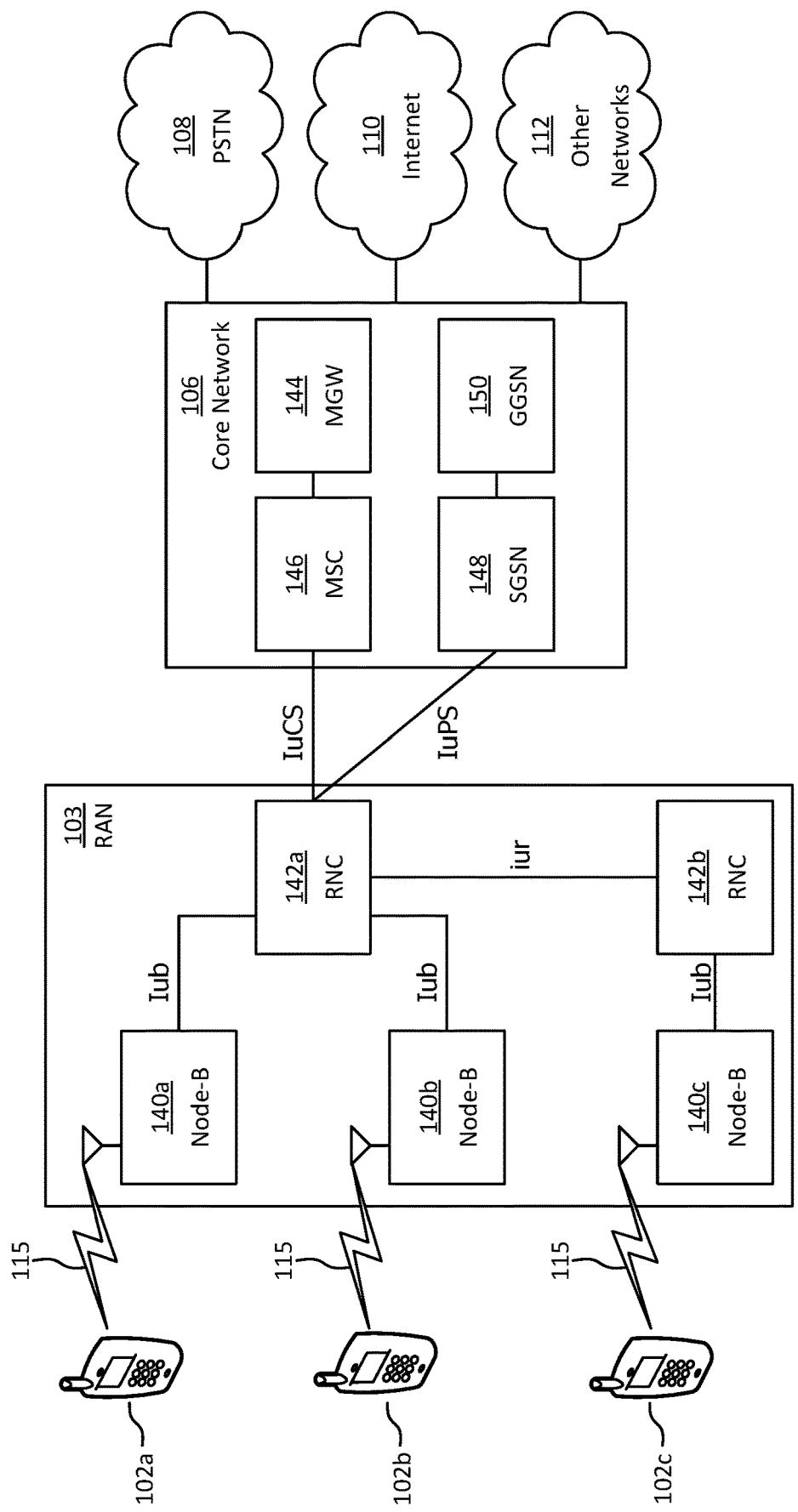
FIGS. 1B, 1C, and 1D are system diagrams of example RANs and core networks.

FIG. 1B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 1B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 1B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GARS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 1C:
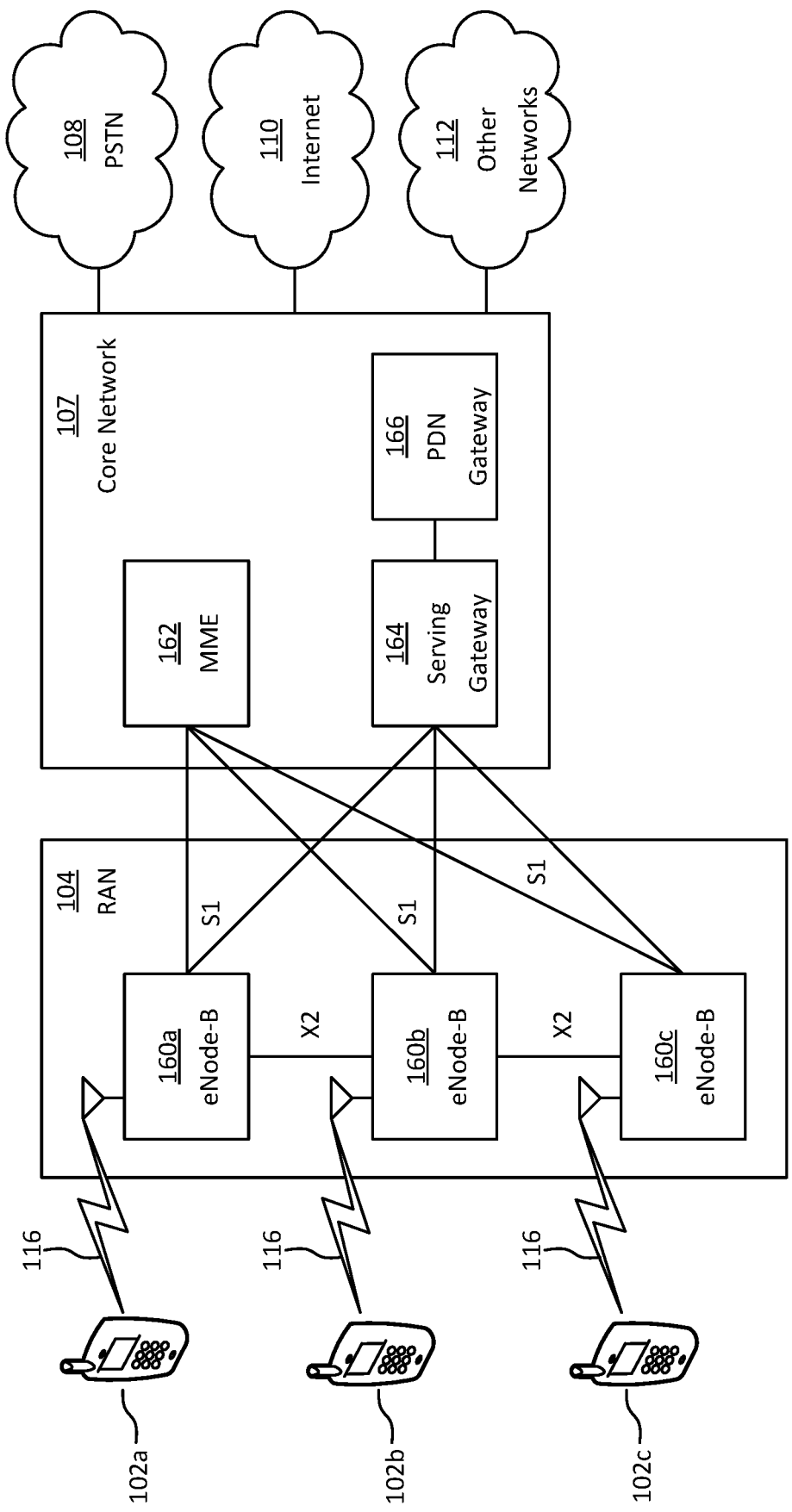

FIG. 1C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, and 160c may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 1D:
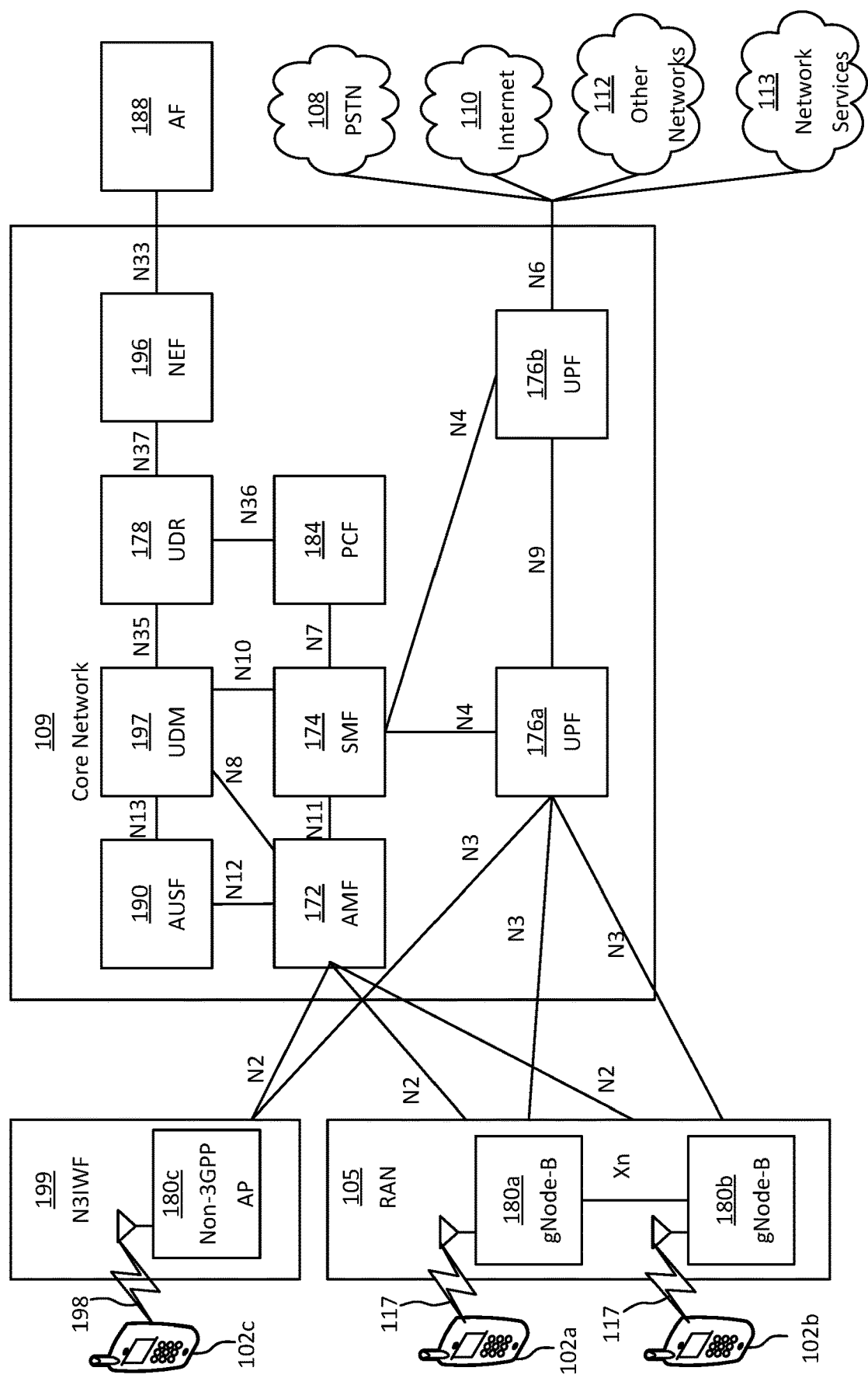

FIG. 1D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1D, the gNode-Bs 180a and 180b may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 1G.

In the example of FIG. 1D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1D.

The SMF 174 may be connected to the AMF 172 via an NH interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases' needs when each use case has its own specific set of performance, scalability, and availability requirements. Furthermore, introduction of new network services should be made more efficient.

Referring again to FIG. 1D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
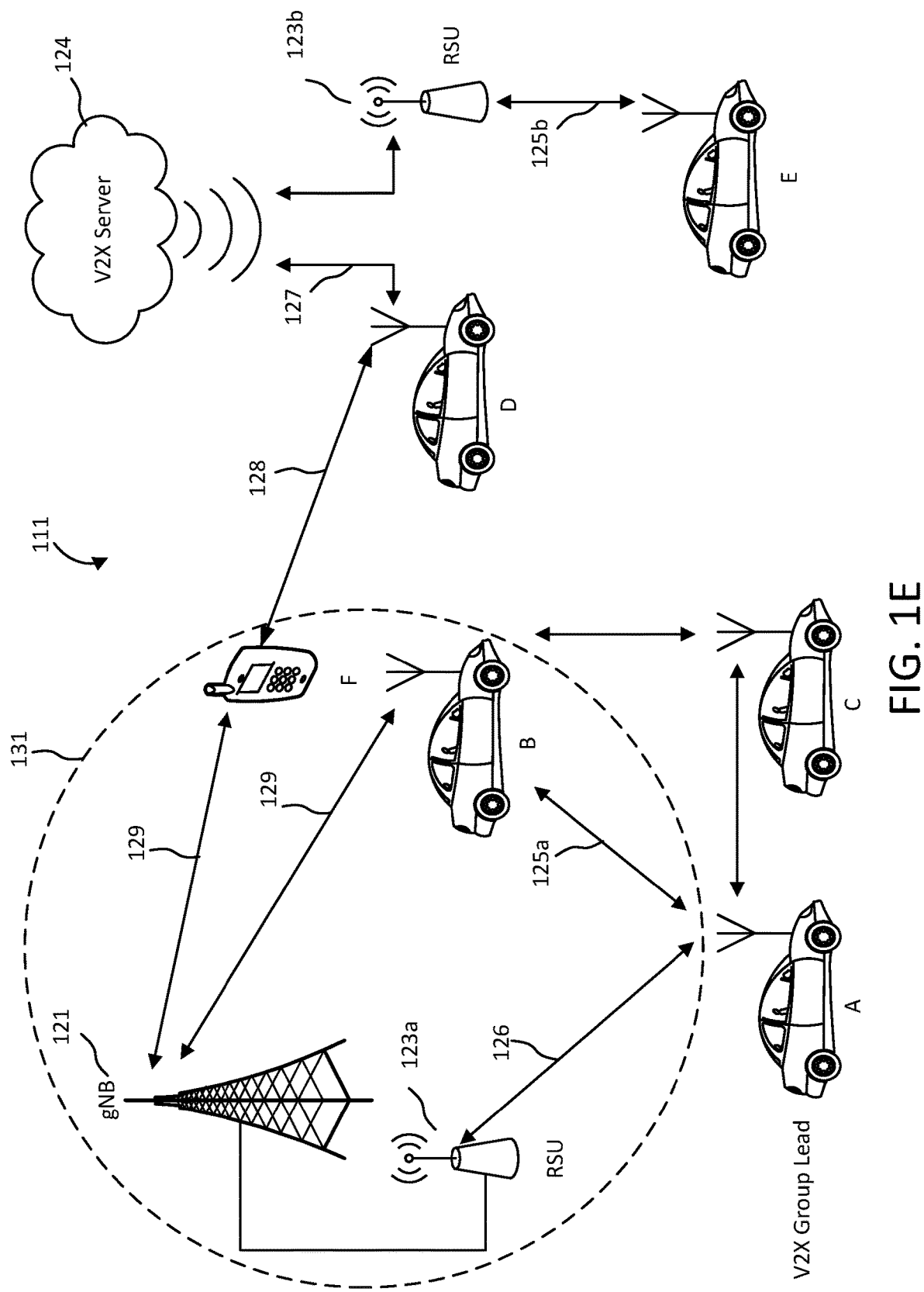
FIG. 1E illustrates another example communications system.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 1E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 1E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
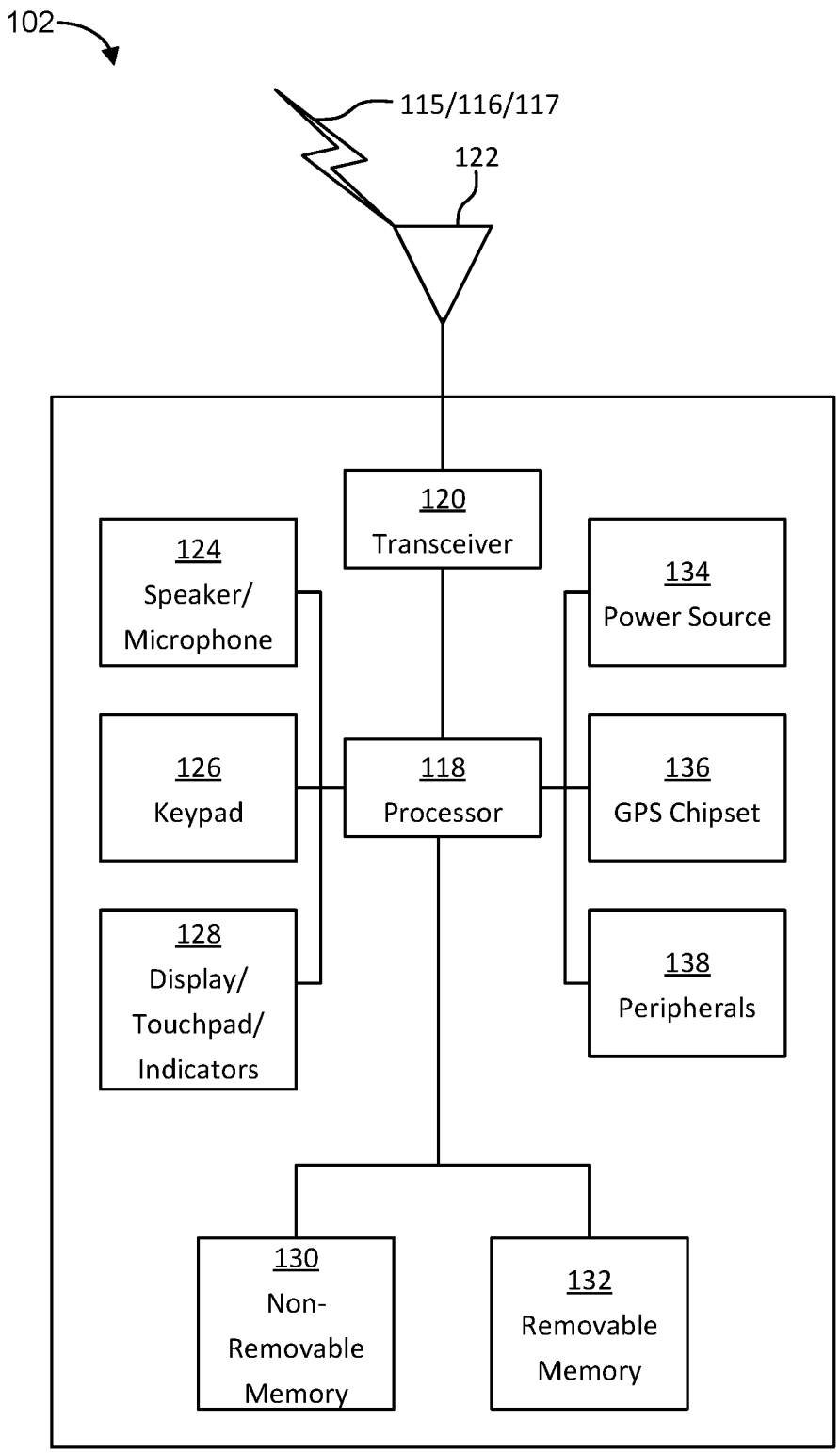
FIG. 1F is a block diagram of an example apparatus or device, such as a WTRU.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 1A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1G:
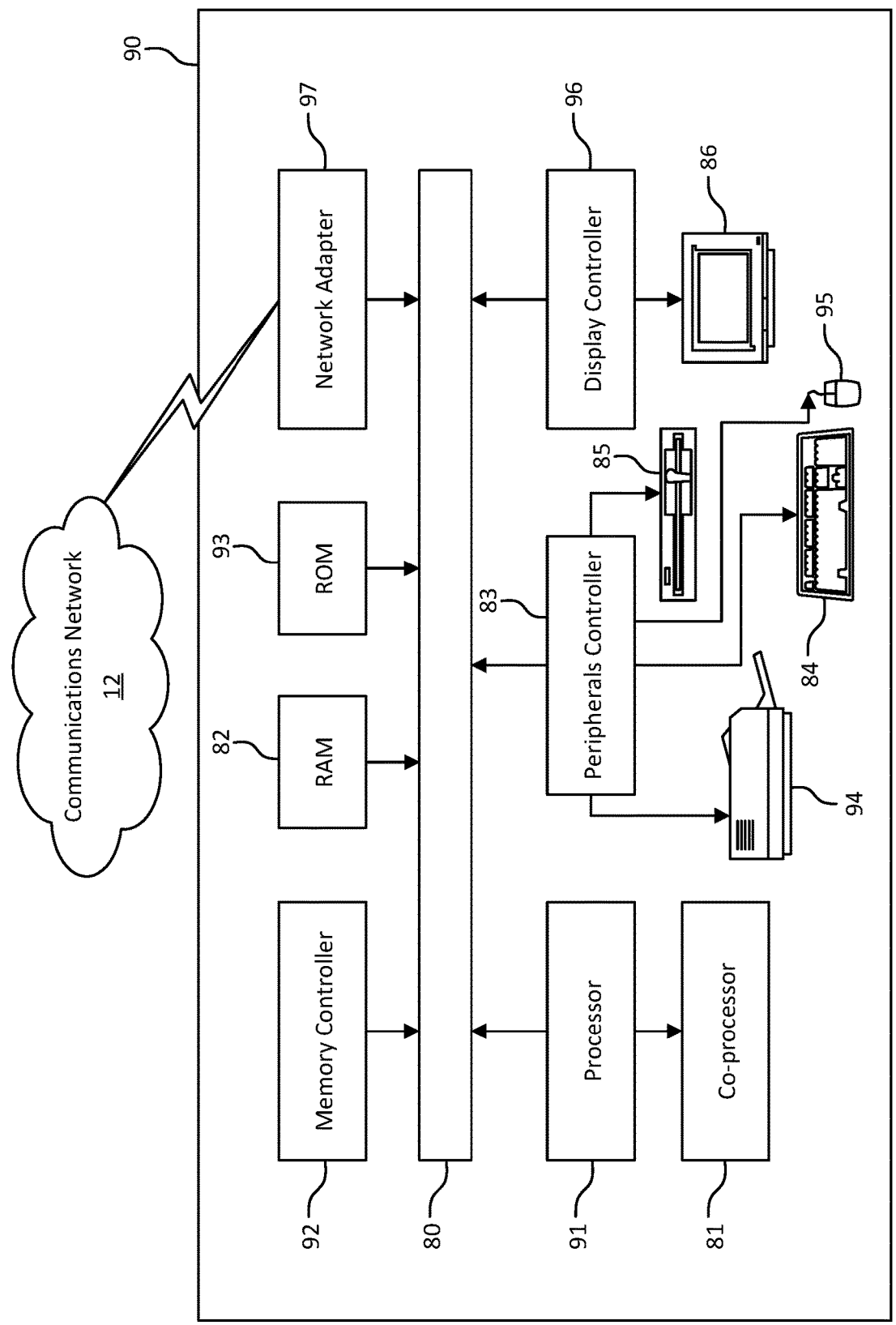
FIG. 1G is a block diagram of an exemplary computing system.

FIG. 1G is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104805, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

The following is a list of acronyms that may appear in the following description. Unless otherwise specified, the acronyms used herein refer to the corresponding terms listed below:
BSR Buffer Status Report
DCI Downlink Control Information
DL Downlink
eNB Evolved Node B
GME Group Management Entity
gNB NR NodeB
IE Information Element
IS In-Sync
L1 Layer 1
L2 Layer 2
L3 Layer 3
LTE Long Term Evolution
MAC Medium Access Control
MAC CE MAC Control Element
NR New Radio
PHY Physical Layer
PLMN Public Land Mobile Network
RAN Radio Access Network
RB Radio Bearer
RLC Radio Link Control
RLF Radio Link Failure
RRC Radio Resource Control
RS Reference Signal
RSRP Reference Signal Received Power
RSRQ Reference Signal Received Quality
RSSI Received Signal Strength Indicator
RSU Road Side Unit
RX Receive
SCI System Control Information
SBSR Sidelink BSR
SPS Semi-persistent scheduling (also referred to as configured grant in NR)
SSR Sidelink SR
SI System Information
SL Sidelink
SR Scheduling Request
UE User Equipment
UL Uplink
V2X Vehicle to Everything
VPMLN Visited PLMN
SL Group
  SL Group is a number of UEs that may be communicating with each other over sidelink. The SL group may also have a group management entity.
Group Mobility
  Group mobility may indicate SL group movements—as the group members move, the SL group may also move.
Group Topology
  Group topology may indicate SL group configuration—as the group members move, the shape or topology of the SL group may also change. For example, all members UEs may be in a single lane road, or all member UEs may be huddled close together at a multi-lane intersection.
Member UE
  Member UE is a UE that may be part of a SL group.
Controlling Entity
  Controlling Entity may be an entity that provides the radio resource control to the UEs involved in the SL communication.
Scheduling Entity
  Scheduling Entity may be an entity that allocates resources for an SL communication, if the SL communication uses a scheduled allocation mode. Two types of Scheduling Entity may be defined: an SL based Scheduling Entity and an Uu based Scheduling Entity. An SL based Scheduling Entity may communicate with the UEs it is scheduling via the sidelink. In this case, the Scheduling Entity may be another UE or an RSU. A Uu based Scheduling Entity communicates with the UEs it is scheduling via the Uu interface. In this case, the Scheduling Entity may be a gNB.

Group Management Entity

Group Management Entity may be an entity that performs group management functions, including group formation (e.g., initial group formation, subgroup formation, subgroup lead selection/election), group member addition, group member removal, or group dismissal.

Non-Scheduled Sidelink Transmissions

Non-scheduled sidelink transmissions may be Sidelink transmissions which rely on resource allocation mode 2(a). Such transmissions may be based on sensing and the UEs may make the scheduling decisions autonomously.

Scheduled Sidelink Transmissions

Scheduled sidelink transmissions may be Sidelink transmissions which rely on resource allocation mode 1 or mode 2(d). Such transmissions are scheduled either by the gNB or through a Scheduling Entity.

SL Communication

SL Communication may be a Sidelink communication between two peer UEs.

SL Group Communication

SL Group Communication may be a Sidelink communication between more than two UEs. The transmissions amongst the group may be a unicast, a groupcast, or a broadcast.

The terms "SL Communication" and "SL Group Communication," as used herein, may refer to any direct communication between two or more UEs. For example, such direct communication may involve communication between two or more UEs associated with vehicle-to-everything (V2X), non-V2X, or pedestrian-to-everything (P2X).

LTE V2X Mobility and NR V2X Mobility

An NR UE may support one of the following resource allocation modes:

mode 1, where a Base Station (e.g., gNB) may schedule SL resource(s) to be used by UE for SL transmission(s);

mode 2(a), where a UE may determine (i.e., a Base Station may not schedule) SL transmission resource(s) within SL resources, configured by base station/network or pre-configured SL resources. The UE may autonomously select an SL resource for transmission;

mode 2(c), where a UE may determine (i.e., a Base Station may not schedule) SL transmission resource(s) within SL resources, configured by base station/network or pre-configured SL resources. The UE may be configured with NR configured grant (e.g., Type-1 like) for SL transmission; and mode 2(d), where a UE may determine (i.e., Base Station may not schedule) SL transmission resource(s) within SL resources, configured by base station/network or pre-configured SL resources. The UE may schedule SL transmissions of other UEs. The UE may be provided with a set of resources that it may allocate for SL transmissions.

An LTE SL resource Configuration may be provided through (pre) configuration, or through system information, or through dedicated signaling. An SL resource configuration may contain information about the resource pools, such as receive pools, normal transmit pools, and exceptional transmit pools.

Exceptional transmit resource pool may be used during periods when a UE may not be ready to use the normal transmit pools. This may occur when:

a UE may be having a radio connectivity issue to its serving cell;

a UE has been told to perform a handover, but has not yet synchronized to the target cell; and a UE has performed a cell reselection to a new cell and is waiting for SL sensing results.

The following guidelines have been agreed for NR V2X Uu Mobility procedures.

The network may provide pools of resources in which a UE autonomously may select sidelink grant for a sidelink unicast, groupcast, or broadcast via broadcast system information and/or dedicated signaling.

During handover, the transmission and reception of V2X SL communication may be performed based on at least configuration of the exceptional transmission resource pool and reception resource pool of the target cell, which can be used by the UE during handover, may be provided in the handover command.

Cell selection and reselection for V2X SL communication may be performed based on at least the following criteria and configurations:

The carrier frequencies that may provide V2X SL resource configuration or inter-frequency configuration may be (pre-)configured;

The frequencies providing inter-frequency V2X SL configurations may be prioritized during cell (re-) selection; and It is up to a UE implementation how to minimize the interruption of V2X SL transmission and reception during cell reselection.

A UE may have multiple simultaneous sidelink communications. The SL communication may be unicast, groupcast, or broadcast. Each of these may be configured as an SL RB.

Problem Statement

Owing to UE mobility, SL communications, between two UEs or amongst a group of UEs may change topology. For example, for a group of UEs that make up a platoon, the group topology may change as the UEs move from a single lane to a double lane road, or as the UEs go around a bend in the road. In addition, the group may also move. Using the same platoon example, as the UEs travel along a road, in effect the platoon or group also travels along the road. As a result, the UEs involved in SL communications may be expected to have to deal with a number of mobility events. These mobility events may include, for example, cell reselection, handover, or moving out-of-coverage. If care is not taken to handle these mobility events, the SL communications may have difficulty supporting the diverse and stringent QoS requirements of certain sidelink services. Thus, the following issues may be addressed.

Issue 1: V2X Impacts on UE Mobility Procedures

Today, V2X communications and UE mobility behavior are not tightly linked in the specification. It is expected that UEs that can only use a certain frequency for SL transmissions will prioritize that frequency during inter-frequency cell reselection. However, the impact of V2X communication on procedures such as PLMN selection, paging, or reading of system information has not been considered. In addition, the V2X communication may provide certain possibility for optimizations of the UE mobility procedures.

Issue 2: Mobility Event Impacts on V2X Communication

Mobility events cannot be avoided, however their impact on V2X communication may be minimized. For example, mobility events typically result in the UEs having to change their TX Resource pools and RX Resource pools. Dynamically changing resource pools may have an impact on the communication over the sidelink, especially in cases where the sidelink transmissions are scheduled. In addition, these mobility events are typically characterized with small periods where the UE is not ready or capable of using the allocated resource pools. In such cases, the UE is expected to use exceptional resource pools. However, these pools may rely on random access for resource selection and may negatively impact the QoS of the SL service.

Issue 3: V2X Mobility Impact on Group Management

Some V2X services are inherently group based, for example cars in a platoon setting. Owing to UE mobility, a number of triggers will change the dynamics of a group—and this may occur quite often. As the dynamics of the group change, the SL communication may degrade. Each trigger may require a unique set of actions to counter the SL performance degradation.

SUMMARY

UE mobility may have a significant impact on the sidelink communication between peer UEs and on the SL Group Communication between a group of UEs. In addition, since these mobile UEs may be participating in SL communication or SL Group Communication, their Uu mobility procedures may also be impacted. The present application discloses systems and methods for optimizing: Handover procedures for UEs with ongoing SL communications, cell reselection procedures for UEs with ongoing SL communications, and transition to RRC_IDLE and RRC_INACTIVE for UEs with ongoing SL communications. Also, disclosed are systems and methods of PLMN selection for UEs requiring sidelink communication or with active sidelink communication, as well as systems and methods that provide priority-based resource allocation while using exceptional transmit resource pools. Furthermore, disclosed herein are SL group management procedures to deal with impacts of UE mobility.

Network Architecture with V2X Mobility

UEs communicating through SL may communicate over unicast links, groupcast links, or broadcast links. For some V2X services, SL communication may be only required between two UEs, and, typically, this communication is unicast. For other V2X services, SL communication may be required between a UE and multiple other UEs—the UEs forming a group. For example, in a V2X platoon scenario, SL communication may be required between all UEs in the platoon. In such a case, SL communication between the group members may be unicast, groupcast, broadcast, or any combination of these links—that is unicast links to some UEs and groupcast links to other UEs. The UEs communicating through SL may be out-of-coverage of a cellular network or in-coverage of a cellular network. The UEs that may be in-coverage also have a Uu interface to a serving cell.

A number of entities may be required to assist or allow proper SL communication when we have V2X mobility. These entities may be a Scheduling Entity, a Controlling Entity, and a Group Management Entity, as briefly described below.

Scheduling Entity may be an entity that allocates resources for SL communication, if the SL communication uses a scheduled allocation mode. The Scheduling Entity may be connected to UEs engaged in SL communication through an SL interface (e.g., another UE or RSU) or through an Uu interface (e.g., gNB or RSU). Either interface (SL or Uu) may be through a relay node. The former may be referred to as an SL based Scheduling Entity while the latter may be referred to as an Uu based Scheduling Entity. Alternatively, the Scheduling Entity may be one of the UEs engaged in SL communication. If the SL communication uses a non-scheduled allocation mode, then no Scheduling Entity may be required for that communication.

Controlling Entity may be an entity that provides the radio resource control to the UEs involved in the SL communication. This may include, for example, assigning TX resource pools, RX resource pools, or synchronization information. The Controlling Entity may be connected to UEs engaged in SL communication, through an SL interface (e.g., the Controlling entity is another UE or RSU) or through an Uu interface (e.g., the Controlling Entity is gNB or RSU). Either interface (SL or Uu) may be through a relay node. The former may be referred to as an SL based Controlling Entity while the latter may be referred to as an Uu based Controlling Entity. Alternatively, the Controlling Entity may be one of the UEs engaged in SL communication.

Group Management Entity may be an entity that performs group management functions including, for example, group formation (e.g., initial group formation, subgroup formation, subgroup lead selection/election), group member addition/removal, and group dismissal. The subgroup lead may act as a relay for the subgroup. The Group Management Entity may have context regarding the group, such as the entity acting as a Scheduling Entity or the controlling entity for each group member. The Group Management Entity may be connected to UEs engaged in SL communication through an SL interface (e.g., another UE or RSU) or through an Uu interface (e.g., gNB or RSU). Either interface (SL or Uu) may be through a relay node. The former will be referred to as an SL based Group Management Entity while the latter will be referred to as an Uu based Group Management Entity. The Group Management Entity may also have Controlling Entity functionality, supplying radio resource control for all members of the group.

Figure 2:
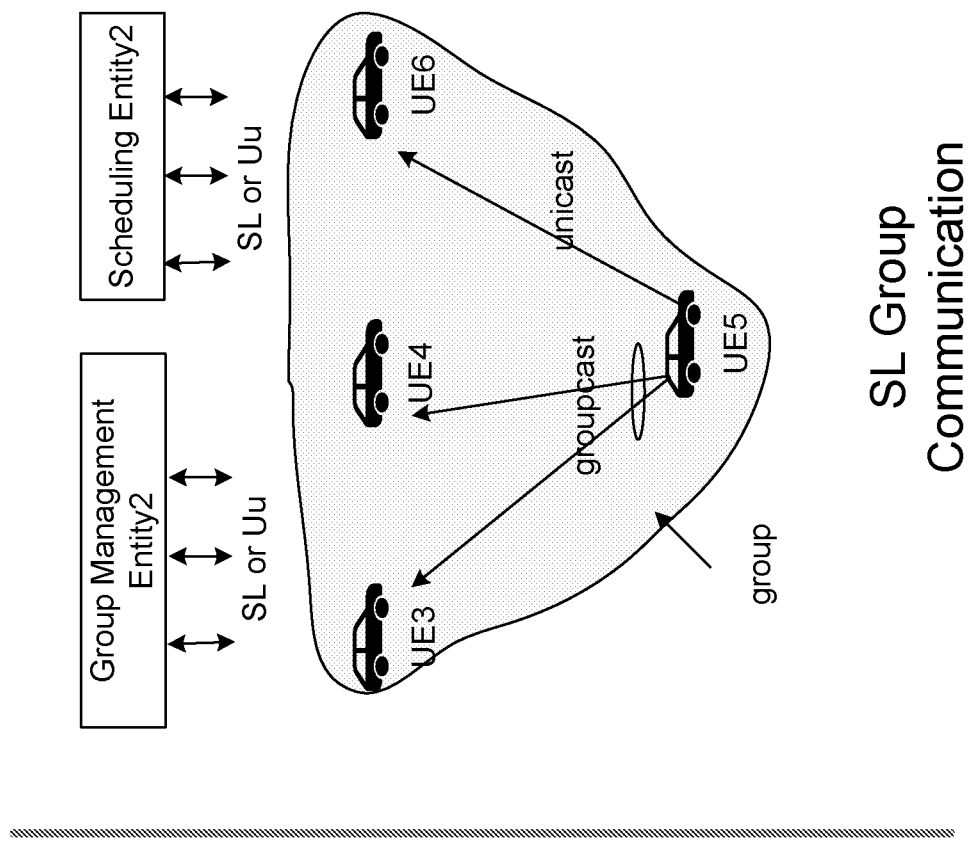
FIG. 2 illustrates an example V2X deployment.
Figure 2:
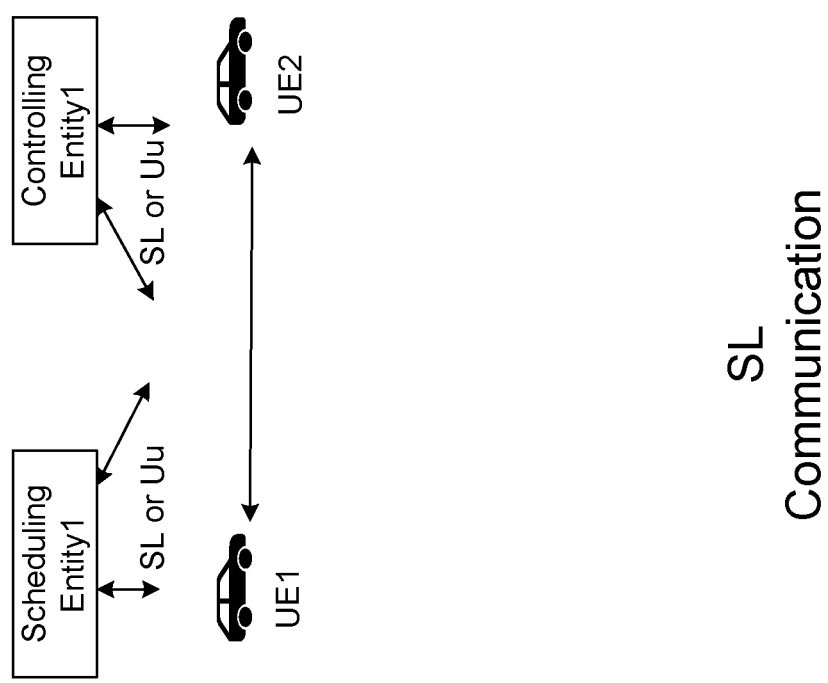

An example V2X deployment is shown in FIG. 2. FIG. 2 shows both a case of SL communication (SL between 2 UEs) and a case of SL Group Communication. In the latter, the SL transmissions are between a UE and K other UEs (K>1). All UEs in FIG. 2 may be in-coverage of a serving cell, or out-of-coverage. UE1 and UE2 may be communicating over a unicast SL. As shown, these UEs may be scheduled by a Scheduling Entity and may be controlled by a Controlling Entity. The Scheduling Entity and the Controlling Entity may be in the same physical node, for example in a gNB. UE3, UE4, UE5. UE6 form a group. UE5 may use groupcast to send SL transmissions to UE3 and UE4 and may use unicast to send SL transmissions to UE6. As shown, the group may be controlled by the Group Management Entity and communications within the group may be scheduled by the Scheduling Entity. The Group Management Entity and the Scheduling Entity may be a functionality of one of the UEs of the group, for example, UE4 may host the Group Management Entity. The Group Management Entity and/or the Scheduling Entity may also be hosted in another UE (e.g. UE7). In such a case, UE7 may be part of the group to allow proper control and scheduling of the group transmissions.

Although entities may be described herein individually, it should be understood that the functionality associated with each of these entities may be shared in one or more physical entities.

Figure 3:
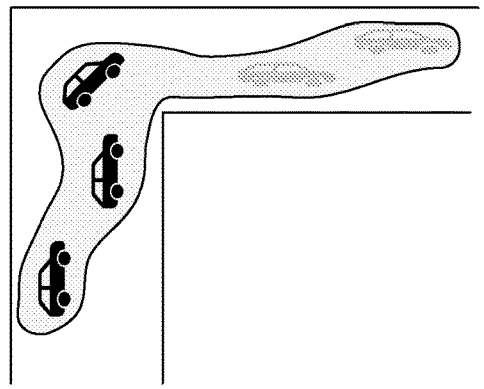
FIG. 3 illustrates examples of V2X mobility.
Figure 3:
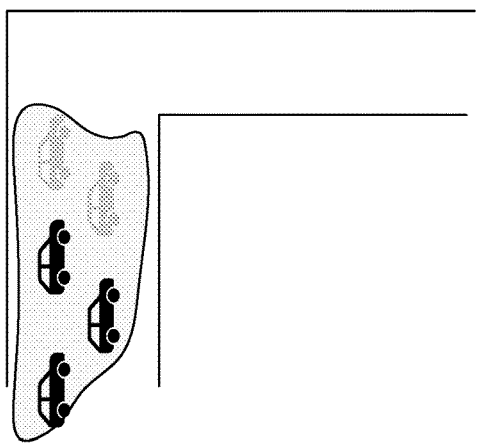
Figure 3:
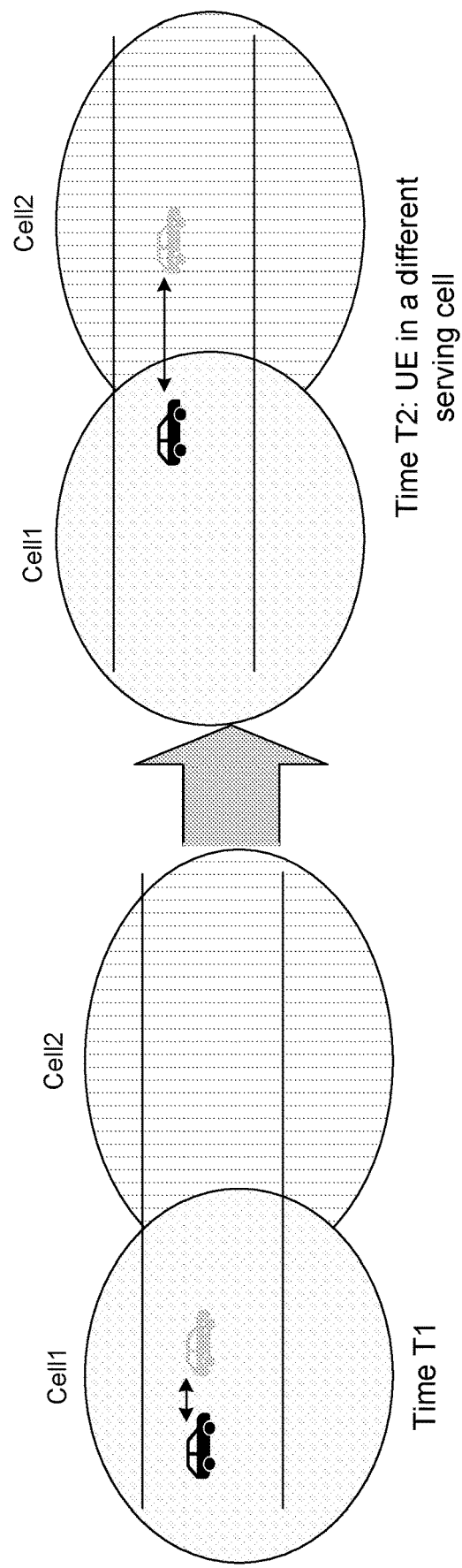

Owing to UE mobility, SL communications, between two UEs or amongst a group of UEs, may change topology. For example, for a group of UEs that may make up a platoon, the group topology may change as the UEs move from a single lane to a double lane road, or as the UEs go around a bend in the road. In addition, the group may also move. Using the same platoon example, as the UEs travel along a road, in effect the platoon or group also travels along the road. Lastly, each of the UEs may transition among varying RRC states. For example, changing states among RRC_IDLE, RRC_INACTIVE, RRC_CONNECTED as the UE transmission requirements on the Uu interface changes. Typical V2X mobility examples are shown in FIG. 3.

As a result of the mobility of the UEs, events such as the change in topology of the UEs, or the dynamic RRC state change of the UEs may occur. Such events may be comprising the following occurrences.

- A UE may change its serving cell; both for UEs in RRC_IDLE and RRC_CONNECTED mode.
- UEs that are in-coverage may fall out-of-coverage (and vice versa).
- UEs may change their configured TX resource pools. The resource pools may change depending on: geographical zone while out-of-coverage, serving cell, validity area (if SL configuration is preserved across all cells of a validity area), in-coverage vs out-of-coverage; RRC state (IDLE vs INACTIVE vs CONNECTED).
- UEs may use exceptional TX resource pools. These resource pools may be used when a UE experiences some issue on its radio link to the serving cell, during a transition from RRC_IDLE to RRC_CONNECTED, during a handover procedure, during a cell reselection, when sensing results are not available, etc.
- UEs may lose permission to transmit on the SL. For example, this may occur when in an IDLE mode, UEs perform periodic PLMN search and select a PLMN that does not allow SL communication. This may also occur when in an IDLE mode, UE performs an inter-frequency cell reselection to a frequency that does not support SL communication. This may also occur when in a connected mode, UE performs an inter-frequency handover to a frequency that does not support SL communication. This may also occur when a UE moves to a geographic area (zone) where SL communication may not be permitted.
- UEs may lose SL connectivity to one another. For example, this may be based on distance between the UEs or interference. A UE may lose connectivity to the Group Management Entity, the Scheduling Entity, the Controlling Entity, or to the other UEs it is communicating with on the SL.

The above described events may lead to problems associated with the SL communication, described with respect to three deployment options: out-of-coverage, partial-coverage, in-coverage. For each of these options, a table is presented below which describes issues that may arise when one or more of the above events occurs and respective solutions. As disclosed herein, it may be assumed that in cases where the SL communication is among a group of UEs, the Group Management Entity has already setup the SL groups, has selected if the group has to be divided into sub-groups, has determined the communication mode to use in the group and the one or more Scheduling Entities for the group.

In the Out-Of-Coverage deployment, all UEs involved in the SL communication may be out-of-coverage of a cell that supports SL communication. Table 1 describes the potential issues for SL Group Communication, where the SL communication is among more than two UEs. Table 2 describes the potential issues for SL Communication, where the SL communication is between two UEs.

TABLE 1

Potential Issues for SL Group Communication when more than two UEs may be Out-of-Coverage

| Event | Result |
|---|---|
| UE loses SL connectivity to SL based Group Management Entity | Group Management Entity can no longer manage UE |
| UE loses SL connectivity to SL based Controlling Entity | SL UE can no longer receive radio resource control |
| UE loses SL connectivity to SL based Scheduling Entity | Scheduling Entity can no longer schedule UE |
| UE loses SL connectivity to another UE | UEs may no longer be able to communicate |
| SL based Group Management Entity is prohibited from transmitting on SL | Group can no longer be managed |
| SL based Scheduling Entity is prohibited from transmitting on SL | No scheduled transmissions over SL is possible |
| UE is prohibited from transmitting on SL | Member UE isolated from group |
| UE allocated new TX Resource pool (different from Tx resource pool used by other SL UEs) | In case of non-scheduled transmission, no major issue expected. The UE will use new Tx resource pool. The other UEs will already be aware of the new Tx resource pool. In case of scheduled transmission, the UE will not be able to be scheduled |
| Scheduling Entity allocated a new TX Resource Pool | Scheduling Entity can only assign resources from new TX Resource pool (this may be different from the pool used by the other SL UEs) |
| UE moves to in coverage | Same as UE changing its Tx Resource pool |

TABLE 2

Potential Issues for SL Communication when two UEs may be Out-of-Coverage

| Event | Result |
|---|---|
| UE loses SL connectivity to SL based Controlling Entity | SL radio link failure |
| UE loses SL connectivity to SL based Scheduling Entity | SL radio link failure |
| UE loses SL connectivity to another UE | SL radio link failure |
| SL based Scheduling Entity is prohibited from transmitting on SL | SL radio link failure |
| UE is prohibited from transmitting on SL | SL radio link failure |
| UE allocated new TX Resource pool (different from Tx resource pool used by other SL UE) | In case of non-scheduled transmission, no major issue expected. The UE will use new Tx resource pool. The other UEs will already be aware of the new Tx resource pool. In case of scheduled transmission, the UE will not be able to be scheduled |
| Scheduling Entity allocated a new TX Resource Pool | Scheduling Entity can only assign resources from new TX Resource pool (this may be different from the pool used by the other SL UEs) |
| UE moves to in coverage | Same as UE changing its Tx Resource pool |

In the In-Coverage deployment, all Member UEs may be in-coverage of a cell that supports SL communication. Table 3 describes the potential issues for SL Group Communication, where the SL communication is among more than two UEs. Table 4 describes the potential issues for SL Communication, where the SL communication is between two UEs.

TABLE 3

Potential Issues for SL Group Communication when more than two UEs may be In-Coverage

| Event | Result |
|---|---|
| UE changes its serving cell (intra-frequency) | UE may change its Tx Resource pool. No issue for non-scheduled resource allocation. For scheduled resource allocation, the Scheduling Entity may not be able to schedule UE |
| UE changes its serving cell (inter-frequency or inter-RAT) | UE changes its Tx Resource pool SL communication between group members no longer possible |
| UE loses SL connectivity to SL based Group Management Entity | Group Management Entity can no longer manage Member UE |
| UE loses SL connectivity to Uu based Group Management Entity | Group Management Entity can no longer manage Member UE |
| UE loses SL connectivity to Uu based Controlling Entity | Effectively, the UE has moved out-of-coverage. Same as UE changing its Tx Resource pool (would use its pre-configured pool) |
| UE loses SL connectivity to SL based Controlling Entity | SL UE can no longer receive radio resource control |
| UE loses SL connectivity to Uu based Scheduling Entity | Effectively, the UE has moved out-of-coverage. Same as UE changing its Tx Resource pool (would use its pre-configured pool) |
| UE loses SL connectivity to SL based Scheduling Entity | Scheduling Entity can no longer schedule Member UE |
| UE loses SL connectivity to another Member UE | UEs may no longer be able to communicate |
| UE allocated new TX Resource pool (different from Tx resource pool used by other SL UEs) | In case of non-scheduled transmission, no major issue expected. The UE will use new Tx resource pool. The other SL UEs will already be aware of the new Tx resource pool. In case of scheduled transmission, the Member UE will not be able to be scheduled |
| SL based Scheduling Entity (UE) allocated a new TX Resource Pool | Scheduling Entity can only assign resources from new TX Resource pool (this may be different from the pool used by the SL UEs) |
| UE moves to out of coverage | Same as UE changing its Tx Resource pool (would use its pre-configured pool) |
| UE uses exceptional resource pool | The performance of the sidelink communication may not be guaranteed |

TABLE 4

Potential Issues for SL Communication when two UEs may be In-Coverage

| Event | Result |
|---|---|
| UE changes its serving cell (intra-frequency) | UE may change its Tx Resource pool. No issue for non-scheduled resource allocation. For scheduled resource allocation, the Scheduling Entity may not be able to schedule UE |
| UE changes its serving cell (inter-frequency or inter-RAT) | UE changes its Tx Resource pool SL communication may no longer possible |

TABLE 4-continued

Potential Issues for SL Communication when two UEs may be In-Coverage

| Event | Result |
|---|---|
| UE loses SL connectivity to SL based Scheduling Entity | SL radio link failure |
| UE loses SL connectivity to SL based Controlling Entity | SL radio link failure |
| UE loses SL connectivity to another UE | SL radio link failure |
| UE allocated new TX Resource pool (different from Tx resource pool used by other SL UE) | In case of non-scheduled transmission, no major issue expected. The UE will use new Tx resource pool. The other UE will be already be aware of the new Tx resource pool. In case of scheduled transmission, the UE will not be able to be scheduled |
| SL based Scheduling Entity allocated a new TX Resource Pool | Scheduling Entity can only assign resources from new TX Resource pool (this may be different from the pool used by the Other SL UE) |
| UE moves to out of coverage | Same as UE changing its Tx Resource pool (would use its pre-configured pool) |
| UE uses exceptional resource pool | The performance of the sidelink communication may not be guaranteed |

In Partial-Coverage deployment, some UEs may be in-coverage of a cell that supports SL communication, while the remaining UEs may be out-of-coverage of a cell that supports SL communication. In this case of SL Group Communication, the group may already be split into two sub-groups as the UEs will not be able to use the same TX Resource pools—one sub-group for UEs in-coverage, and a second sub-group for UEs out-of-coverage. Table 5 describes the potential issues for SL Group Communication, where the SL communication is among more than two UEs. Table 6 describes the potential issues for SL Communication, where the SL communication is between two UEs.

TABLE 5

Potential Issues for SL Group Communication when more than two UEs may be in Partial-Coverage

| Event | Result |
|---|---|
| In Coverage UE changes its serving cell (intra-frequency) | UE may change its Tx Resource pool No issue for non-scheduled resource allocation. For scheduled resource allocation, the Scheduling Entity may not be able to schedule UE |
| In-Coverage UE changes its serving cell (inter-frequency or inter-RAT) | UE changes its Tx Resource pool SL communication between group of UEs may no longer possible |
| UE loses SL connectivity to SL based Group Management Entity | Group Management Entity can no longer manage Member UE |
| UE loses SL connectivity to Uu based Group Management Entity | Group Management Entity can no longer manage Member UE |
| UE loses SL connectivity to Uu based Controlling Entity | Effectively the UE goes out-of-coverage. Same as UE changing its Tx Resource pool (would use its pre-configured pool) |
| UE loses SL connectivity to SL based Controlling Entity | SL UE can no longer receive radio resource control |

TABLE 5-continued

Potential Issues for SL Group Communication when
more than two UEs may be in Partial-Coverage

| Event | Result |
|---|---|
| UE loses SL connectivity to Uu based Scheduling Entity | Effectively the UE goes out-of-coverage. Same as UE changing its Tx Resource pool (would use its pre-configured pool) |
| UE loses SL connectivity to SL based Scheduling Entity | Scheduling Entity can no longer schedule UE |
| UE loses SL connectivity to another SL UE | UEs may no longer be able to communicate |
| UE allocated new TX Resource pool (different from Tx resource pool used by other SL UEs) | In case of non-scheduled transmission, no major issue expected. The UE will use new Tx resource pool. The other SL UEs will be already be aware of the new Tx resource pool. In case of scheduled transmission, the UE will not be able to be scheduled |
| Scheduling Entity (UE) allocated a new TX Resource Pool | Scheduling Entity can only assign resources from new TX Resource pool (this may be different from the pool used by the SL UEs) |
| UE moves to in coverage | Same as UE changing its Tx Resource pool |
| UE moves to out of coverage | Same as UE changing its Tx Resource pool (would use its pre-configured pool) |
| UE uses exceptional resource pool | The performance of the sidelink communication may not be guaranteed |

TABLE 6

Potential Issues for SL Communication
when two UEs may be in Partial-Coverage

| Event | Result |
|---|---|
| In-Coverage UE changes its serving cell (intra-frequency) | UE may change its Tx Resource pool. No issue for non-scheduled resource allocation. For scheduled resource allocation, the Scheduling Entity may not be able to schedule UE |
| In-Coverage UE changes its serving cell (inter-frequency or inter-RAT) | UE changes its Tx Resource pool SL communication between UEs may no longer possible |
| In-Coverage UE loses SL connectivity to Uu based Controlling Entity | Effectively the UE goes out-of-coverage. Same as UE changing its Tx Resource pool (would use its pre-configured pool) |
| In-Coverage UE loses SL connectivity to Uu based Scheduling Entity | Effectively the UE goes out-of-coverage. Same as UE changing its Tx Resource pool (would use its pre-configured pool) |
| UE loses SL connectivity to SL based Scheduling Entity | SL radio link failure |
| UE loses SL connectivity to SL based Controlling Entity | SL radio link failure |
| UE loses SL connectivity to other UE | SL radio link failure |
| UE allocated new TX Resource pool (different from Tx resource pool used by other SL UE) | In case of non-scheduled transmission, no major issue expected. The UE will use new Tx resource pool. The other SL UE will be already be aware of the new Tx resource pool. In case of scheduled transmission, the UE will not be able to be scheduled |
| Scheduling Entity (UE) allocated a new TX Resource Pool | Scheduling Entity can only assign resources from new TX Resource pool (this may be different from the pool used by the SL UEs) |
| UE moves to in coverage | Same as UE changing its Tx Resource pool |
| UE moves to out of coverage | Same as UE changing its Tx Resource pool (would use its pre-configured pool) |
| UE uses exceptional resource pool | The performance of the sidelink communication may not be guaranteed |

Disclosed below are proposed solutions to the three issues of V2X Impacts to UE Mobility Procedures, Mobility Event Impacts on V2X Communication, and V2X Mobility Impact on Group Management presented above.

Solutions to Issue 1: V2X Impact to UE Mobility Procedures

In order to support the solutions to Issue 1, a UE may provide SL Communication context to its serving gNB. This context may be used by the gNB to assist the SL communication during a mobility event. A UE may provide the following information to the gNB:

Resource allocation mode used by a UE: Mode 1, Mode 2, simultaneous Mode 1 and Mode 2;

In a case where a UE has a special SL role—the UE acts as a Scheduling Entity, Controlling Entity, or Group Management Entity—the UE may provide an indication of the number of UEs it is controlling, scheduling, or managing;

Number of SL RBs;

Cast type for each SL RB (e.g., unicast, groupcast, broadcast) and, for groupcast, the size of the group;

For each SL RB, an indication if this SL RB should be transferred to the target cell (some SL RBs may be dropped or released at cell handover, cell reselection, transition to RRC_IDLE, or transition to RRC_INACTIVE);

For each SL RB, the UEs Scheduling Entity, Controlling Entity, or Group Management Entity; and RLC mode for each of the SL RBs.

Figure 4:
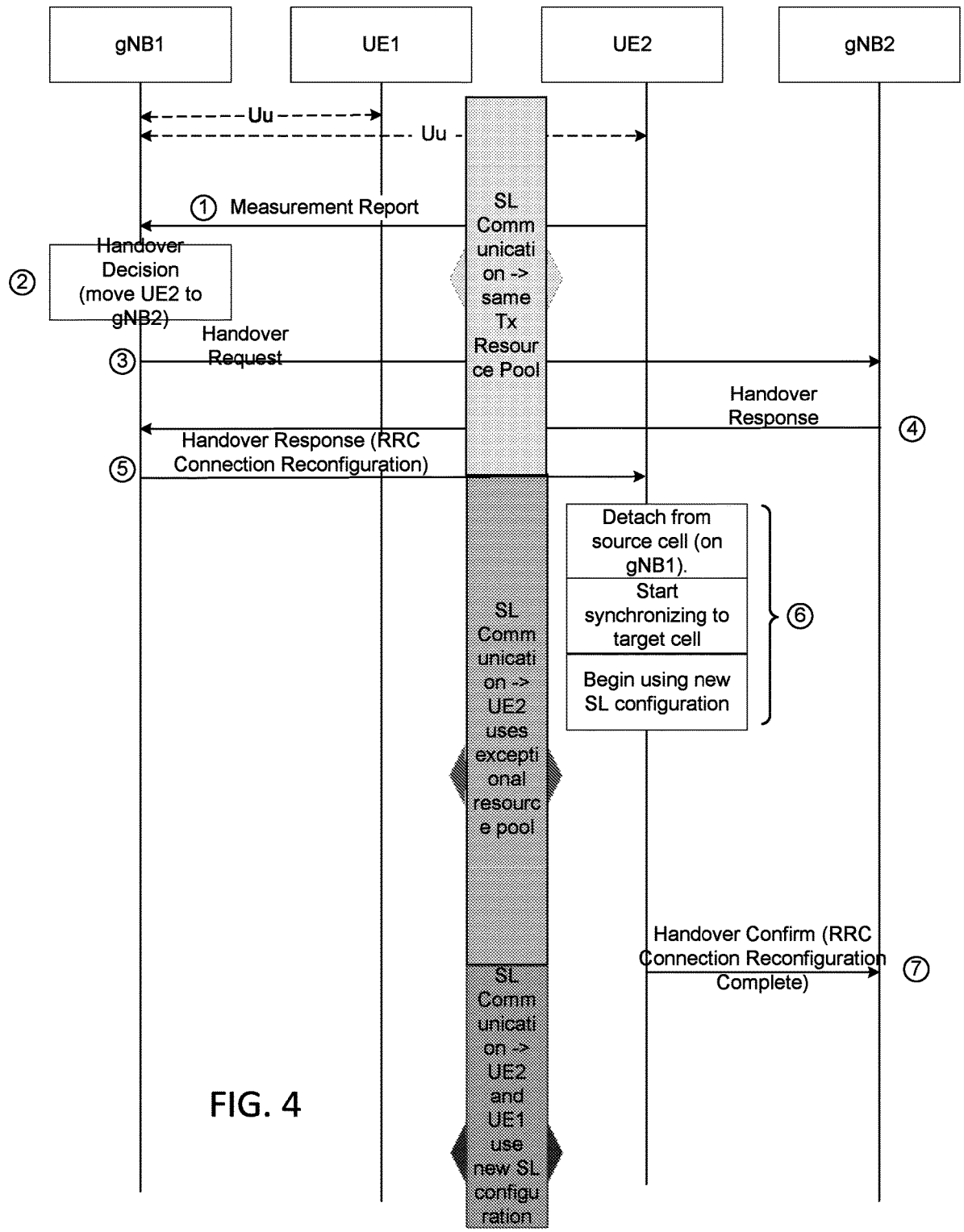
FIG. 4 is a call flow example of a V2X communications impact cell handover.

In the case where a mobility event is of a handover event, UE1 and UE2 may be involved in a SL communication, and UE2 may then undergo a cell handover from a source cell to a target cell. V2X communications impact cell handover is demonstrated by the call flow shown in FIG. 4. In FIG. 4, in Step 1, UE2 may send a measurement report to gNB1. The report may indicate that it would be better for a target cell to serve the UE rather than the current source cell. A target cell may be "better" than a source cell based on a measurement quantity, e.g., RSRP, RSRQ, or SINR, or based on an event, e.g., when a measurement quantity of the source cell is above or below a threshold, when a measurement quantity of a target cell is above or below a threshold, or when the measurement quantity of a target cell becomes an offset better than source cell (see specifications 38.331). In Step 2, gNB1 may decide to handover UE2 to gNB2. Accordingly, in Step 3, gNB1 may send a handover command to gNB2. This command may include an indication of the requirements of the SL communication between UE1 and UE2 or any other assistance information such as position and, at least for periodic traffic: traffic periodicity, timing offset, and message size. In addition, gNB1 may include information related to the sidelink communication of UE2. This may include:

Resource allocation mode used by UE2: Mode 1, Mode 2, simultaneous Mode 1 and Mode 2;

If Mode 1 or (simultaneous Mode 1 and Mode 2) configured SPS for UE sidelink transmissions, received measurement results for sidelink transmissions, and available scheduling information for UE (e.g., pending SR, BSR reports);

Cast type for each SL RB (unicast, groupcast, broadcast), where, for groupcast, it may provide the size of the group;

If UE has a special SL role—UE acts as a Scheduling Entity, Controlling Entity, or Group Management Entity—the UE may provide an indication of the number of UEs it is controlling, scheduling or managing;

For each SL RB, an indication if this SL RB should be transferred to the target cell (some SL RBs may be dropped or released at cell handover); and For each SL RB, the UEs Scheduling Entity, Controlling Entity, or Group Management Entity.

In Step 4, If gNB2 accepts the handover request, it may issue a Handover Response. This response message may include the SL configuration details to use in the target cell. Including a new TX resource pool and potentially a configured grant to use in the target cell. gNB2 may store the obtained UE context (e.g., measurements, scheduling). The Handover Response may include:

A list of SL RBs that are to be transferred to new cell;
A list of SL RBs that are to be dropped for the UE;
SL resource configuration for each SL RB including any new/modified SRS for the SL RB;
For each transferred SL RB, the identity of the UEs new Scheduling Entity, Controlling Entity, or Group Management Entity; and
For each SL RB, the mechanism to use for resource reselection during the exceptional resource pool phase (e.g., random or scheduled).

In Step 5, UE2 may receive a Handover Response from gNB1. The UE2 then may detach from source cell, in Step 6, and may begin synchronization with the target cell. UE2 may also update its SL communications based on the new SL configuration details included in Step 5. Next, in Step 7, once synchronized to the target cell, UE2 may send a Handover Confirm to gNB2.

In the case where a mobility event is a cell reselection event, UE1 and UE2 may be involved in a SL communication, and UE2 may undergo a cell reselection from a source cell to a target cell. V2X communications impact cell reselection is demonstrated by the call flow shown in FIG. 5. In Step 1 of FIG. 5, UE2 may take intra-frequency and inter-frequency measurements based on a set of standardized rules. Then, in Step 2, UE2 may rank cells. If one cell is better than the current cell for Treselection$_{RAT}$, then UE2 may reselect this cell. In order to delay the impact of the cell reselection on any ongoing sidelink communications, UE2 may be better off to keep UE2 in the source cell longer. If UE2 has SL RBs (requiring low latency) it may scale the Treselection$_{RAT}$ based on:

number of SL RBs for the UE;
The priority of the SL RBs;
the latency requirements of the SL RBs, for example, scale Treselection$_{RAT}$ only if the SL RB requires low latency; and
Activity on any of the SL RBs, for example, UE2 may be waiting for a feedback from the peer UE or waiting for a HARQ feedback from a peer UE or has a configured SL grant. Alternatively, the thresholds can be modified. For example, the threshold related to Qoffset may be scaled.

Next in Step 3. UE2 may synchronize to the selected cell. In Step 4, UE2 may read system information of the chosen cell (it may get the SL resource configuration). This system information may include exceptional resource pool and normal resource pool information. In Step 5, UE2 may begin to use SL transmissions on exceptional resource pool. Then, in Step 6, UE2 may perform SL sensing to help in resource selection. When sensing results ready, in Step 7, UE2 may begin to use SL transmissions on normal TX resource pool.

Note that UE2 may not be able to transmit on the SL during the interval between Step 3 and Step 5, as UE2 has no SL resource configuration for the target cell. The following alternatives may be carried out.

Carry SL resource configuration for the target cell in the neighbor cell information of the source cell. This may be through broadcast system information or through dedicated signaling. This may also include an indication that the exceptional resource pool is common between the source cell and the neighbor cell.

UE2 may move to RRC_CONNECTED mode in the source cell to retrieve this information, before performing the cell reselection. UE2 may retrieve this information for a selected neighbor cells, for example those for which the cell ranking suggests a potential for cell reselection. This may be a new trigger for a UE to move to a connected mode—e.g., Retrieve neighbor cell SL configuration information for SL connection.

Have the exceptional resource pool common across a validity area. UE2 may be told that the exceptional resource pool is common across a validity area. If the target cell is in this validity area, then UE2 may need not wait to read the SI before using exceptional resource pool.

Note that UE2 may be required to use exceptional resource pool during the interval between Step 5 and Step 7. This may be while UE2 performs SL sensing to help in resource selection. This sensing time may be reduced by having UE2 obtain the sensing information from peer UE. Using the exceptional resource pool, UE2 may ask peer UEs to share their sensing information. UE2 may ask the peer UEs for which it already has a connection, or it may send a broadcast sidelink message requesting assistance from other UEs. This message may include the cell ID that it wants sensing results for.

Figure 6:
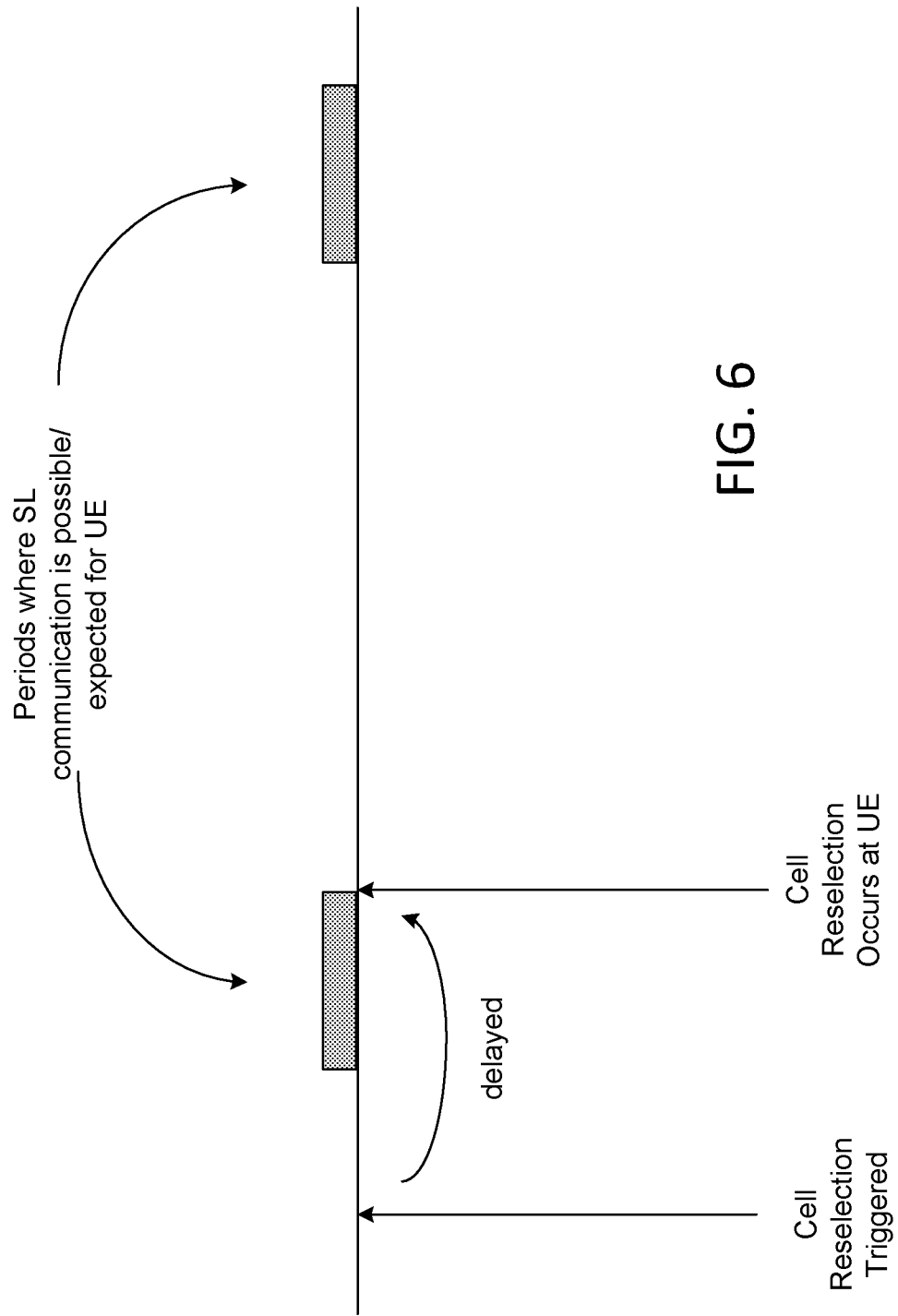
FIG. 6 illustrates an example a delayed cell reselection.

Note that during Step 2, a target cell is reselected if it is better ranked than the current cell for a period of Treselection$_{RAT}$. The reselection decision may not based on any activity on the sidelink. In an alternative, the reselection may be delayed until a period of low SL activity. For example, there may be intervals or periods of time during which UE2 knows that it will not be involved with any sidelink communications. This may be based on configured grants, sensing, or SL configuration details. After a cell reselection is triggered, UE2 may decide to delay cell reselection until these periods, for example, as depicted in FIG. 6.

Note that UE2 may also evaluate how long it has until the next possible or expected UE2 SL transmission. If this time is long enough, UE2 may decide to perform the cell reselection immediately after the trigger. In addition, UE2 may be configured with a maximum reselection delay timer. If this timer expires, UE2 may decide to perform the cell reselection regardless of the SL activity.

Figure 5:
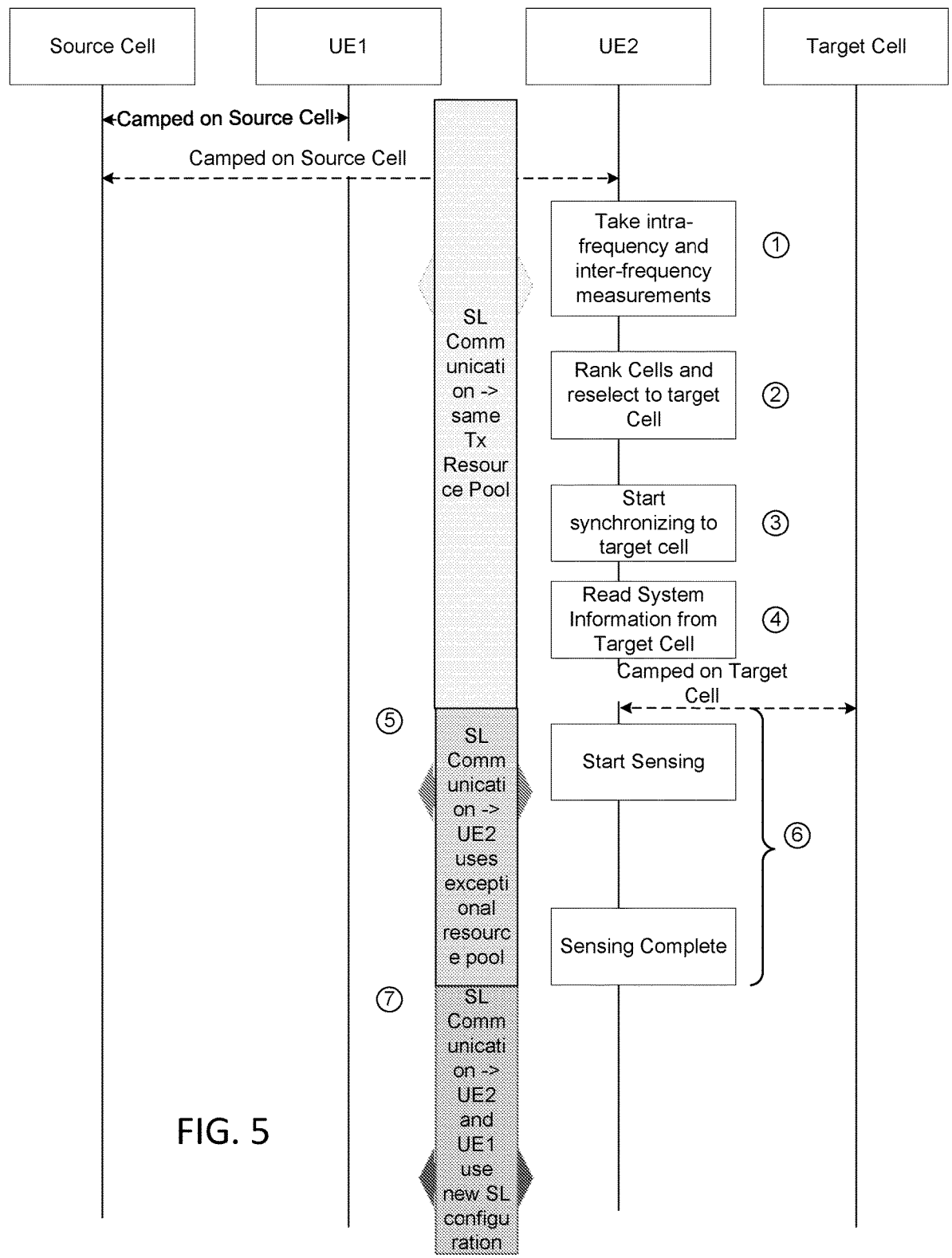
FIG. 5 is a call flow example of a V2X communications impact cell Reselection.

Note that during Step 1 and Step 2 of FIG. 5, as part of the cell reselection procedure, UE2 may also take measurements and may rank inter-frequency cells. It is expected that if a UE requires SL service, and SL communications is only available on certain frequencies, that this UE will prioritize these frequencies for cell reselection. In cases where multiple frequencies support SL communication, there may be issues if a UE that has ongoing SL communication on one frequency (f1) reselects a new frequency (f2). In such a case, the ongoing communication with the peer UE(s), on frequency f1, will be broken. As a result it is proposed to change the cell reselection rules for inter-frequency cells. Namely if a UE has any ongoing sidelink transmissions on a frequency, this frequency is the highest priority. This may also be based on the type of SL RB. For example, some SL RBs may require continuity at cell reselection, while others may be okay with the use of exception resource pool or declaration of an SL Radio Link Failure (RLF).

A mobility event may be an event of transition to RRC_IDLE or RRC_INACTIVE state. A network may release a UEs RRC connection and transition the device to It is proposed herein that if a UE has active SL RBs or intends to use SL communications, it should try to select a PLMN that supports SL communication. For example, during periodic PLMN search, such UEs may not consider PLMNs on the equivalent PLMN list that do not support SL communication. Alternatively, these PLMNs may be deprioritized with respect to PLMNs that do support SL communication.

In order to support the above, it is proposed herein that the cells broadcast SL communication support in the system information. For example, in SIB1, as part of the PLMN-IdentityInfoList IE (SLCommunicationSupport):

```
-- ASN1START
-- TAG-PLMN-IDENTITYINFOLIST-START
PLMN-IdentityInfoList ::=       SEQUENCE (SIZE (1..maxPLMN)) OF PLMN-IdentityInfo
PLMN-IdentityInfo ::=           SEQUENCE {
    plmn-IdentityList               SEQUENCE (SIZE (1..maxPLMN)) OF PLMN-Identity,
    trackingAreaCode                TrackingAreaCode            OPTIONAL,   -- Need R
    ranac                           RAN-AreaCode                OPTIONAL,   -- Need R
    cellIdentity                    CellIdentity,
    cellReservedForOperatorUse      ENUMERATED {reserved, notReserved},
    SLCommunicationSupport          ENUMERATED {true}           OPTIONAL,   -- Need R
    ...
}
-- TAG-PLMN-IDENTITYINFOLIST-STOP
-- ASN1STOP
```

RRC_IDLE or RRC_INACTIVE. The UE may receive a RRCRelease message with a redirectedCarrierInfo information element (IE). This IE may provide the UE with information related to the cell on which to camp on. If the UE has ongoing SL RBs in RRC_CONNETCED, the network may provide additional information in the redirectedCarrierInfo information element (IE) to assist the SL communication during the transition from RRC_CONNECTED to RRC_IDLE/RRC_INACTIVE. For example, the IE may include one or more of the following:

A list of SL RBs that may be redirected to new carrier;
A list of SL RBs that may be dropped for the UE and may not be redirected to new carrier, for example, some SL RBs may only operate on Mode 1 and may be dropped upon moving to RRC_IDLE or RRC_INACTIVE;
For each transferred SL RB, the identity of the UEs new Scheduling Entity, Controlling Entity, or group management entity; and
For each SL RB, the mechanism to use for resource reselection during the exceptional resource pool phase (e.g., random or scheduled).

A mobility event may be an event of a PLMN Selection. In some cases, it is possible that a PLMN may not support SL communications. UEs of these operators may still want to use SL communication. One option is to allow UEs to roam on a visited network in order to use SL communication. In this case a first operator may not want to support SL communication and it may have an agreement with another co-located second operator that does support SL communication. The second operator may allow the first operator's UEs to roam onto its network in order to use SL communication. Current PLMN selection would not allow a UE to select the second operator's network.

In other cases, when a UE is in a VPLMN, it may try to find its Home PLMN or equivalent Home PLMN. If one or more of the equivalent Home PLMNs does support SL communication, and the UE intends to use SL communication, then the UE should try to avoid these during its periodic PLMN search.

Solutions to Issue 2: Mobility Events Impact to V2X Communications

In the case where a mobility event is a cell handover, UE1 and UE2 may be involved in a SL communication, and UE2 may undergo a cell handover from a source cell to a target cell. Cell handover impact on V2X communications is demonstrated by the call flow shown in FIG. 7. In Step 1 of FIG. 7, UE2 may send a measurement report to gNB1. The report may indicate that a target cell is better than the current source cell. In Step 2, gNB1 may decide to handover UE2 to gNB2. Then, in Step 3, gNB1 may send a handover command to gNB2. This command may include an indication of the requirements of the SL communication between UE1 and UE2 or any other assistance information such as position and, at least for periodic traffic, information such as traffic periodicity, timing offset, and message size. In Step 4, if gNB2 accepts the handover request, it may issue a Handover Response. This response message may include the SL configuration details to use in the target cell, including a new TX resource pool and potentially a configured grant to use in the target cell.

In Step 5, UE2 receives a Handover Command from gNB1. Then, in Step 6, UE2 may detach from source cell, and may begin to try to synchronize with the target cell. During this time, the UE may use exceptional resource pool of the target cell. UE2 may obtain this information from the Handover Command of Step 5. Once synchronized to the target cell, in Step 7, UE2 may send a Handover Confirm to gNB2.

Figure 7:
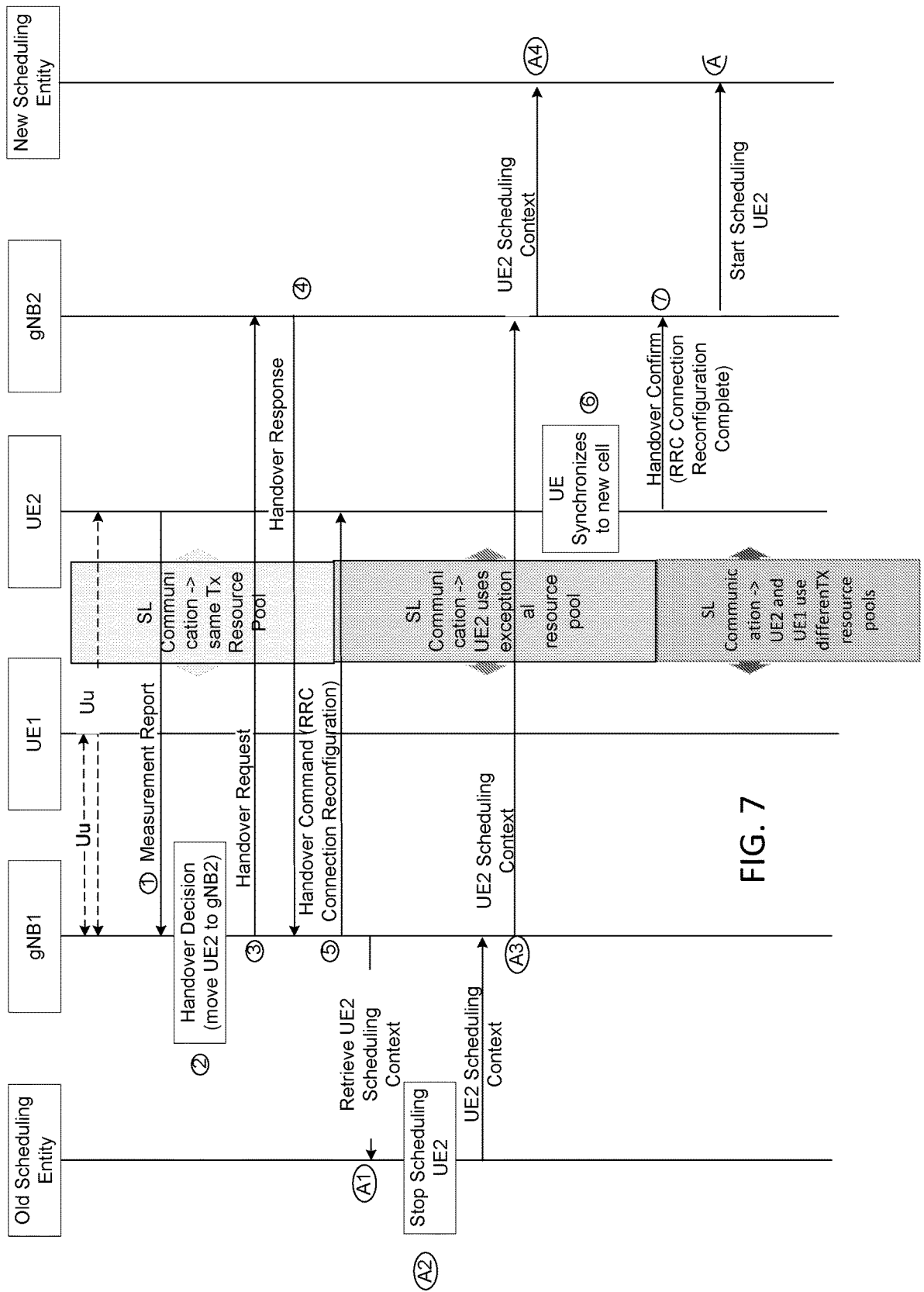
FIG. 7 is a call flow example of a cell handover impact on V2X communications.

Referring to Option A in FIG. 7, UE2 may use a new Scheduling Entity, for example this could be gNB2 or another UE that may also be served by gNB2. In this case, the old Scheduling Entity may be having Scheduling context about UE2 sidelink transmissions. This context may include, for example, active or ongoing SPS assigned to UE2, any pending BSR received from UE2, any pending SRs received from UE2, or any SL related measurements received from UE2 and maintained at the Scheduling Entity. This context may be provided to the new Scheduling Entity. Disclosed herein the following alternatives.

In Step A1, if necessary, gNB1 may retrieve the UE2 scheduling context from the old Scheduling Entity.

In Step A2, old scheduling entity may stop scheduling resource allocations for UE2. This may include releasing any configured grant resources allocated to UE2. The context information may be maintained in the old scheduling entity for a period of time after the scheduling is stopped, in case the handover to the target cell fails. This may be timer based. Once the timer expires, the old scheduling entity may remove UE2 scheduling context.

In Step A3, gNB1 may send the UE2 scheduling context to gNB2. The transmission mechanism may be the same as used for the message in Step 3.

In Step A4, gNB2 may forward the UE2 scheduling context to the new scheduling entity.

In Step A5, Scheduling entity may wait for an indication that UE2 has completed the handover before starting to schedule resources for UE2. This message may come from UE2 (say upon reception of an SR or BSR from UE2). Alternatively, this indication may come from gNB2. After receiving Handover Confirm from UE2, gNB2 may send message (start indication) to the new scheduling entity to start.

Note that the exchanges described in Steps A1, A4, A5 may be internal to gNB2, for example, if gNB2 hosts the Scheduling Entity for the SL communication between UE1 and UE2. Alternatively, if the Scheduling Entity is another UE, these exchanges may be implemented as PC5 RRC, MAC CE, SCI, or a combination of these.

In a case where a mobility event is a cell reselection event, UE1 and UE2 may be involved in a SL communication. UE2 may be in RRC IDLE state and UE2 may undergo a cell reselection from an old cell to a new cell. In such cases, there may be issue when UE2 is using mode 2(d) type resource allocation (where the scheduling entity is another UE). Cell reselection impact on V2X communications with mode 2(d) is demonstrated by the call flow shown in FIG. 8.

Figure 8:
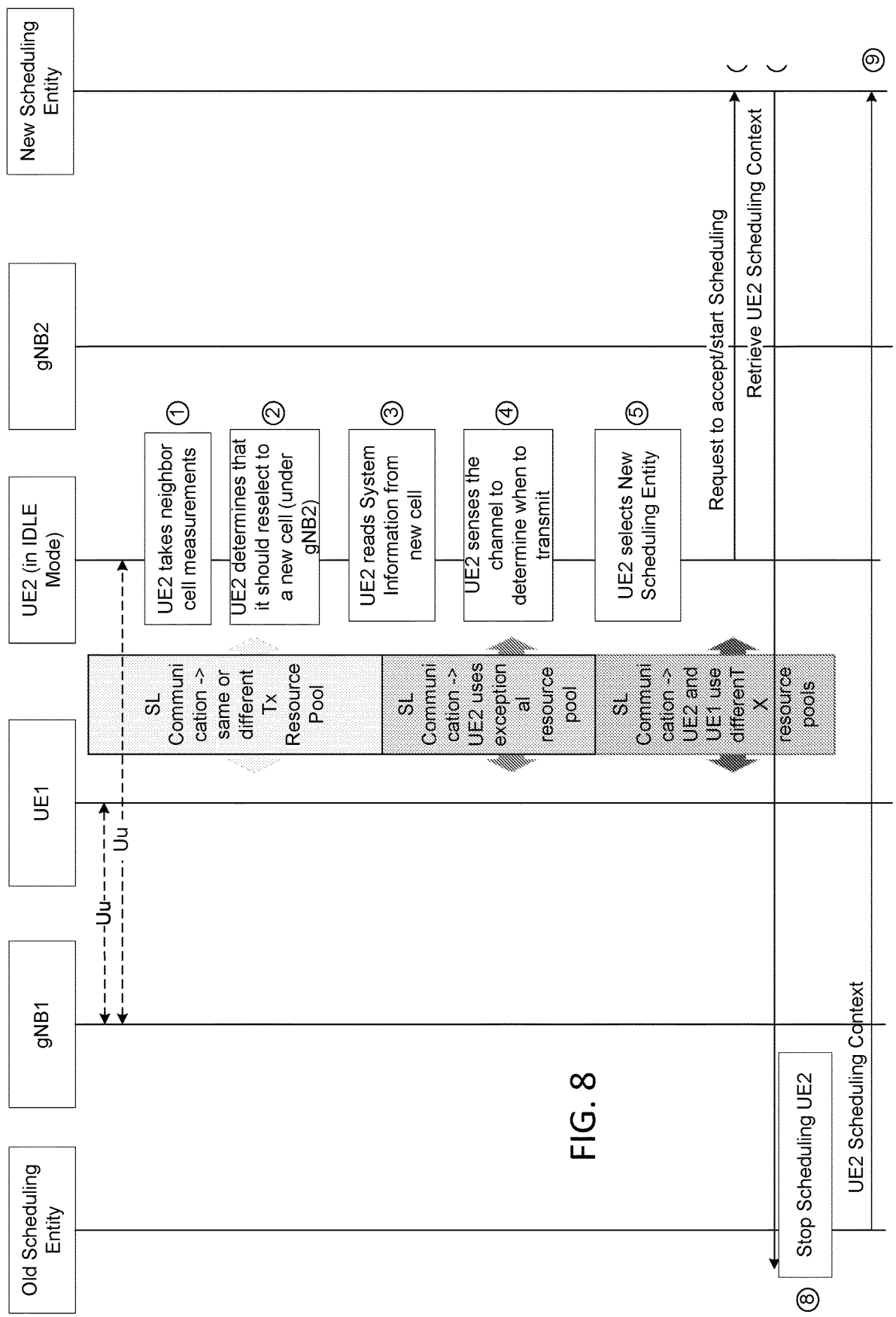
FIG. 8 is a call flow example of a cell reselection impact on V2X communications with mode 2(d).

In Step 1 of FIG. 8, UE2 may take measurements of neighbor cells. Then, in Step 2, UE2 may determine whether to reselect to a new cell. In Step 3, UE2 may read the system information of the new cell. As part of this step, UE2 may be provided with the TX Resource pools to use in this cell. In Step 4, UE2 may sense the channel and may use exceptional resource pool, until it may get the sensing result. UE2 may select a Scheduling Entity in the new cell, in Step 5. UE2 may be provided with the identity of the Scheduling Entity as part of the System Information broadcast in the new cell (in Step 3). Alternatively, UE2 may perform a discovery to determine nearby UEs that are acting or willing to act as Scheduling Entities.

In Step 6, UE2 may ask selected Scheduling Entity (New Scheduling Entity) to start scheduling it. UE2 may also provide some Scheduling context, as well as the identity of the UE performing the scheduling in the old cell (Old Scheduling Entity). In Step 7, if necessary; New Scheduling Entity may retrieve the remaining UE2 scheduling context from the Old Scheduling Entity. This transmission may be over the sidelink. Then, in Step 8, Old scheduling entity may stop scheduling resource allocations for UE2. This may include releasing any configured grant resources allocated to UE2. The context information may be maintained in the old scheduling entity for a period of time after the scheduling is stopped, in case UE2 returns to the old cell. This may be timer based. Once the timer expires, the old scheduling entity may remove UE2 scheduling context. In Step 9, Old Scheduling Entity may return the UE Scheduling context to New Scheduling Entity, and, in Step 10, UE2 may be scheduled from new scheduling entity.

Use of Exceptional Resource Pools is disclosed next. In FIG. 7 and in FIG. 8, there is a period of time after the mobility event, where the SL communication may rely on exceptional resource pools. These are resource pools that may be shared by all SL UEs, and are intended to provide some continuity to the SL communication during periods when a UE is not aware of which TX resource pool to use. In particular, FIG. 7 shows the case where UE2 has received a handover command to move to target cell, but has not yet synchronized to this target cell. Similarly, FIG. 8 shows the case where UE2 has reselected the new cell, but has not yet received enough sensing results from this cell for proper resource allocation. In addition to these two cases, other cases for use of exceptional resource pool may exist, for example, a UE assessing that its radio quality to the serving cell is poor.

As the use of the exceptional resource pool may be expected to be based on random access, this may cause a problem for SL services requiring a certain level of guaranteed performance or QoS. As with any random access based scheme, the performance may be expected to degrade further as the density of SL UEs increases. In the present application, three alternatives are proposed to help maintain QoS requirements during periods where a UE may use exceptional resource pools. Disclosed herein aspects of using a modified or alternate resource allocation mechanism with the exceptional resource pool.

A first alternative may comprise dividing the exceptional resource pool into priority based sub-pools. In this approach, the exceptional resource pool may be divided into sub-pools, and traffic may be segregated into each of these sub-pools. A UE may be (pre)configured with a set of one or more sub-pools. Each sub-pool may have an associated priority. For example, the priority may be based on the logical channel priority of the sidelink radio bearer. A sub pool with a certain priority may only serve traffic from a logical channel of the same or higher priority. Alternatively, the exceptional resource pool may be divided into a high priority sub-pool and a low priority sub-pool. The UE may be (pre)configured with a mapping of logical channel priority to sub-pool. The UE may select the appropriate sub-pool based on the priority of the SL service. The UE may then randomly select the resources for transmission from the selected sub-pool.

A second alternative may comprise the use of a prioritized resource selection policy. In this approach, a single exceptional resource pool may be (pre)configured, and the random selection of resources within this pool may be prioritized in an effort to favor sidelink traffic of higher priority. A UE may be (pre)configured with a set of one or more resource selection probabilities (P_res). Each of these probabilities may be associated with one or more priorities. These priorities may be based on the logical channel priority of the sidelink radio bearer. For example, when a UE has sidelink traffic to send and may be required to use the exceptional resource pool, the UE may select the next available resource with probability P_res.

Figure 9:
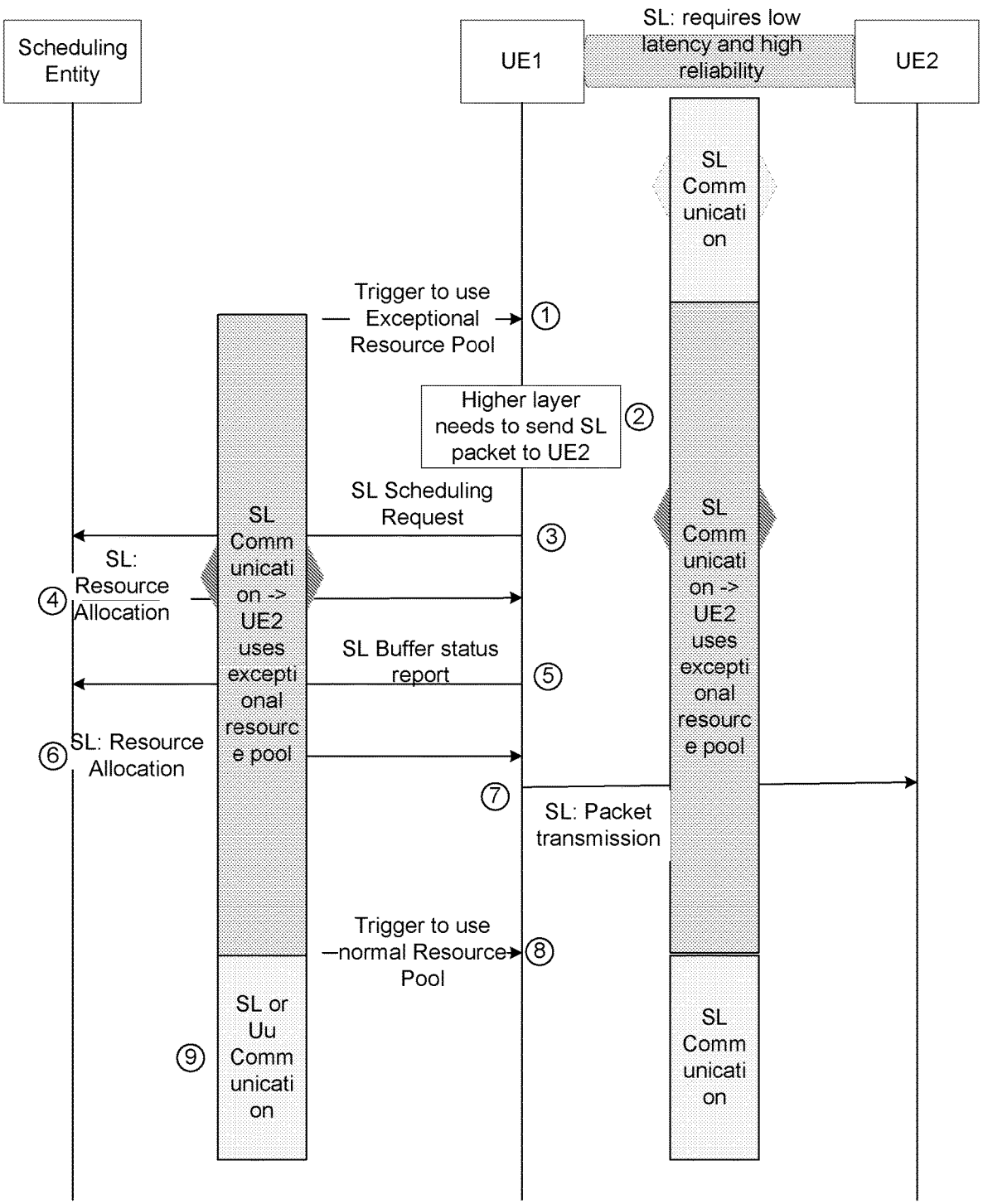
FIG. 9 is a call flow example of an alternative 3 of scheduled exceptional resource pool.

A third alternative may comprise the designating of a scheduling entity for the exceptional resource pool. In this approach, resource allocations over the exceptional resource pool may be scheduled by a dedicated Scheduling Entity. It is typically expected that the scheduling entity in question is the gNB, but it may also be another UE. Details of this approach are shown in FIG. 9 and further described below. It is assumed that UE1 and UE2 are communicating over a sidelink, and that the traffic may require low latency.

In Step 1 of FIG. 9, UE1 may receive a trigger to move to the exceptional resource pool. For example:
- UE1 may have just received a Handover Command to move to a new serving cell. Before UE1 synchronizes to the new cell and Confirms the handover, it uses the exceptional resource pool;
- UE1 may have just performed a cell reselection to a new target cell and is waiting on sensing results before performing autonomous resource selection;
- UE1 may have experienced a radio link issue on its serving cell (UE1 has lost synchronization); and
- UE1 may have just moved from RRC_IDLE to RRC_CONNECTED.

In Step 2, Higher Layer at UE1 (for example application) may generate a packet to send to UE2. Then, in Step 3, UE1 may send a Sidelink Scheduling Request (SSR) to the Exceptional Pool Scheduling Entity over the sidelink using exception resource pool. The identity of the Exceptional Pool Scheduling Entity may be provided:
- through configuration or pre-configuration;
- in system information of the serving cell;
- in system information of the target cell (for example in case of a cell reselection);
- in dedicated signaling from the serving cell (in an RRC message, such as an RRCConnectionSetup or RRCConnectionReconfiguration, or in a MAC CE); or
- in dedicated signaling from the target cell (e.g. in a HANDOVER COMMAND contained in an RRCConnectionReconfiguration).

The Sidelink Scheduling Request may be sent using a PSCCH with a new dedicated SCI format. The SSR may include an indication that UE1 may want to be scheduled so that it may send a sidelink buffer status report (SBSR) to the Exceptional Pool Scheduling Entity. The SSR may also include an indication of the identity of UE1 (for example Source Layer 1 ID of UE1).

In Step 4, Exceptional Pool Scheduling Entity may allocate resources to UE1 for transmission of the SBSR. These resources may be over the exceptional resource pool. Exceptional Pool Scheduling Entity may allocate enough resources for SBSR transmission. This may be signaled to UE1 through a new SCI format. In Step 5, UE1 may send the SBSR to Exceptional Pool Scheduling Entity using the allocated resources. The SBSR may be a new MAC CE. The SBSR may include, for example, an indication of the buffer status, an indication of the destination layer 1 ID, an indication of the source layer 1 ID, and an indication of the priority of the traffic to be transmitted on the SL. In Step 6, Exceptional Pool Scheduling Entity may schedule transmissions on the exceptional resource pool. It may base the scheduling on the amount of data to transmit, the priority of the data to transmit, the source Layer 1 ID, the destination layer 1 ID. Exceptional Pool Scheduling Entity may assign resources for SL transmission from UE1 to UE2. This may be signaled to UE1 through a new SCI format. Next, in Step 7, UE1 may use the assigned resources on the exceptional resource pool, for transmitting the packet to UE2. In Step 8, UE1 may be permitted to use the normal resource pool. For example, when it has sent the RRCConnectionReconfigurationComplete after a handover command. Then, in Step 9, UE1 may use the normal resource pool for sidelink communication to UE2.

Solutions to Issue 3: V2X Mobility Impact on Group Management

Group Context in Group Management Entity. As a result of mobility, the group dynamics may change very often. The Group Management Entity may be responsible for maintaining the group. Based on underlying conditions, Group Management Entity may: change the status of a Member UE;
- split the existing group into one or more sub-groups;
- elect one of the members of the sub-groups as a relay UE;
- remove member UEs from the group;
- change the resource allocation mode of a member UE;
- change the Scheduler Entity for the group;
- assign a Scheduler Entity for a sub-group; or allocate the resource to be used by the Scheduling Entity, potentially including finding common resource pools if the group members don't use the same TX Resource pool.

The Group Management Entity may maintain a context for each of the groups it may be managing (hereafter referred to as Group Context). This context may include the following elements.
- A Group ID, an identifier of the group.
- A Scheduling Entity, if the group requires a scheduling entity. Some use cases may require stringent performance requirements (e.g., delay and latency). These groups may require scheduled sidelink transmissions. The Group Management Entity may also know the identity of the Scheduling Entity (e.g., gNB cell ID or UE ID).
- A list of Subgroups within the Group.
- A Minimum Required Resource Allocation Mode that may specify the resource allocation mode required in the group. This may be 'mode 2(d)', 'mode 1', or 'mode 2(a).'
- A list of Member IDs, the ID for each Member ID.
- For each Member ID, the Group Management Entity may include:
  - in-coverage vs out-of-coverage state, an indication whether each Member UE is in-coverage or out-of-coverage;
  - RRC state (e.g., IDLE, CONNECTED, INACTIVE), an indication of the RRC state for the in-coverage UEs;
  - current serving cell of the in-coverage UEs, for example, a Cell ID;
  - current TX Resource pool for each Member UE;
  - current RX Resource pool for each member UE;
  - current Semi-Persistent Scheduling for Member UEs, each Member UE may receive an assigned semi-persistent scheduling;
  - subgroup information, indicating subgroups that a Member UE is part of (a Member UE may be part of zero, one, or more subgroups);
  - assigned Resource Allocation Mode: Mode 1, Mode 2(a), or Mode 2(d);
  - Scheduling Entity ID, if the assigned Resource Allocation Mode is mode 2(d); and
  - Backup Group Management Entity, indicating whether this Member UE may act as a Backup Group Management Entity when the original group Management Entity loses connection to the Sidelink group.

Group Context in Member UEs. In addition, each Member UE maintains information relating to the group. This context may include the following lists.
- A list of Group IDs: an identifier for each of the groups that the UE may belong to. A UE may belong to more than one group.
- A list of other Group Management Entities that may provide service for this Member UE. These may be used in case the Group Management Entity for the member UE has to be changed.

For each Group ID, the group context may include the following information:
- Group Management Entity ID, the identity of the Group Management Entity;
- Scheduling Entity ID, the identity of the Scheduling Entity—the UE may have a gNB or RSU as a Scheduling Entity (scheduled resource allocation—type mode 1), another UE as a Scheduling Entity (scheduled resource allocation—type mode 2(d)), or it may not have a Scheduling Entity (non-scheduled resource allocation—type mode 2(a))
- A list of Subgroups (within this group) for which this Member UE is a part of; and
- A list of Member UEs, for which this UE may act as a Relay.

Change of Member UE status. In some cases, the status of a Member UE may change. The status may include, for example, serving cell, RRC state, in coverage vs out-of-coverage, change in TX resource pool, or change in RX resource pool. A change to any or all of these may be reflected in the Group context maintained by the Group Management Entity. A Member UE may indicate a change in any of these, by sending a PC5StatusUpdate message to the Group Management Entity.

Change resource allocation mode of a Member UE. The chosen resource allocation mode for a sidelink group may be controlled by Group Management Entity and may be a property of the group. The Group Management Entity may make this decision based on the ongoing services within the group. Some services may have stringent delay and latency requirements, which may necessitate the use of scheduled resource allocations (mode 1 or mode 2(d)). In contrast, some services are best-effort, and, thus, may use either a scheduled or non-scheduled resource allocation mode (mode 1, mode 2(a), or mode 2(d)).

The Group Management Entity may be (pre)-configured with a service-to-resource allocation mode mapping. If a group has multiple ongoing services, the Group Management Entity may determine the resource allocation mode based on priorities. For example, mode 2(d) may be the highest priority, followed by mode 1, followed by mode 2(a). The resource allocation decision may be provided to the Member UEs using a PC5GroupConfiguration command.

When a Member UE is configured to use mode 2(d) resource allocation mode, the UE may rely on a PC5 based Scheduling Entity. As described in the Problem Statement section, a Member UE may lose SL connectivity to this Scheduling Entity. In response, the Group Management Entity may attempt to re-establish the SL connectivity. For example, the Group Management Entity may try to enlist the service of a relay UE. Alternatively, the Group Management Entity may try to change the cast mode used on the sidelink. Alternatively, the Group Management Entity may split the group into subgroups and assign a new Scheduling Entity to serve the Member UE.

In this section, we propose another alternative, where the Group Management Entity may change the resource allocation mode of the Member UE. The Group Management Entity may check whether the Minimum Resource Allocation Mode allows for a Member UE to use a lower resource allocation mode. If so, the Group Management Entity may use a PC5GroupConfiguration command to change the resource allocation mode of the Member UE (for example to mode 2(a)). In response, the Member UE may stop using the Scheduling Entity, and may begin using the non-scheduled approach (sensing, random access, etc.). The Group Management entity may also change the Group context status for this Member UE, to reflect this new resource allocation mode.

Group Management Entity removes Member UE. Owing to mobility, some Member UEs may lose their permission to transmit on a sidelink. In other cases, a Member UE may lose connectivity to other Member UEs. In both cases, these Member UEs should be removed from the group. The overall procedure may comprise the following steps.
- Step 1: Group Management Entity may determine that a Member UE is isolated from the group. It may determine this based on inactivity (no communications to and from the Member UE), an indication from other Member UEs that the Member UE is not responsive, an indication from the Scheduler Entity that Member UE has not been active
- Step 2: Group Management Entity may check if a Member UE is a relay for any other Member UEs. If so, the Group Management Entity may select a new relay UE for these Member UEs. These UEs are updated with a PC5GroupConfiguration
- Step 3: Group Management Entity may remove Member UE from the group context.

Group Management Entity decides to split a group. In some cases, a Group Management entity may split a group into one or more sub-groups. This may be in order to address a coverage issue in the group or perhaps to optimize scheduling sidelink transmissions for the group Member UEs.

Figure 10:
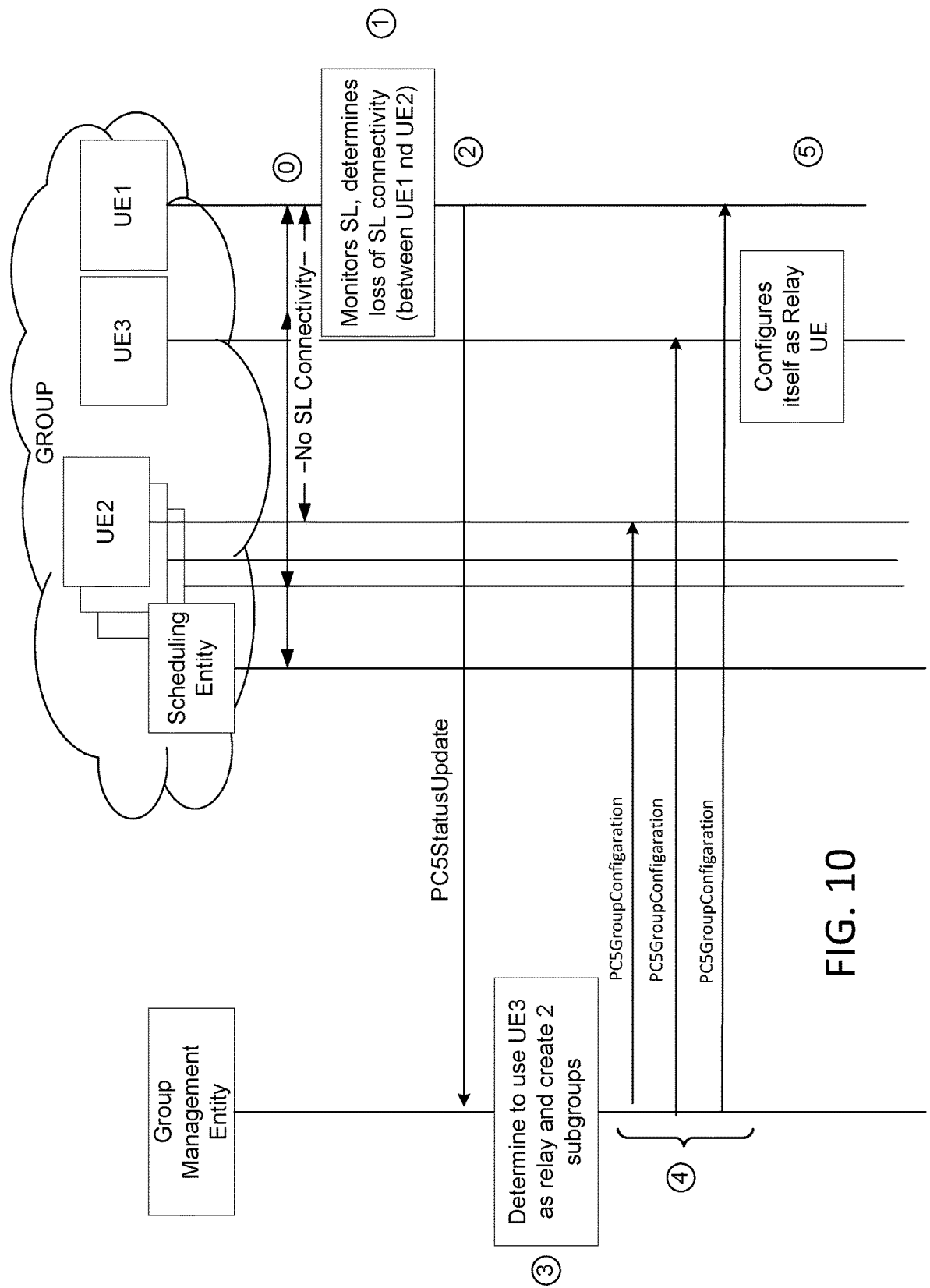
FIG. 10 is a call flow example of splitting group for coverage.

FIG. 10 demonstrates the splitting of a group for coverage reasons. In Step 0, Member UEs (UE1, UE2, . . . UEk) are communicating over sidelink. In Step 1, UE1 may lose SL connectivity to one or more other group members, or to the Scheduling Entity. UE1 may use sidelink radio link monitoring to determine that it has lost this connectivity.

Hereafter it may be assumed that UE1 has lost connectivity to UE2. In Step 2, UE1 may notify Group Management Entity about this loss of sidelink connectivity. For example, this may be by using a message PC5StatusUpdate. Potential contents of the PC5StatusUpdate are shown in Table 7.

In Step 3 of FIG. 10, the Group Management Entity may use its context information as well as information from the PC5StatusUpdate, to determine that UE3 could be used as a Relay UE to assist in the connectivity between UE1 and UE2. The Group Management Entity may select UE3 as a Relay UE, and may create two sub-groups: subgroup1 may include all Member UEs except UE1 and subgroup2 may include UE3 and UE1. Next, in Step 4, Group Management Entity may send a configuration command (PC5GroupConfiguration) to UE3 including an indication that UE3 is to act as a Relay UE and to be part of new subgroup1 and new subgroup2. It may also send a configuration command to UE1 including an indication that UE1 is to be part of new subgroup2. It may also send a configuration command to all other Member UEs that they have been included in subgroup1. Then, in Step 5, UE3 may configure itself as a Relay UE, with membership to both subgroup1 and subgroup2. UE1 may configure itself with membership to subgroup2.

As a special case, if the Member UE loses connectivity to the Group Management Entity, it may be assumed that the latter will be able to detect the loss of connectivity. For example, if the Group Management Entity is using a PC5 interface to the Member UE, it may be performing its own sidelink radio link monitoring and determining that the Member UE has lost connectivity.

A group may be split for reason of better scheduling. Because of mobility, one set of Member UEs may be using one TX resource pool and a second set of Member UEs may be using a different TX resource pool. In the case of non-scheduled sidelink transmission, this may not be an issue. Both sets of UEs autonomously select resources from their respective TX resource pool and each Member UE receives sidelink transmissions from both TX resource pools. In the case of scheduled sidelink transmission, with a Uu based Scheduling Entity, this is also not expected to be an issue. The Member UEs may be scheduled by their respective gNBs, and may be able to receive sidelink transmissions from both TX resource pools. However, in the case of scheduled sidelink transmission with a SL based Scheduling Entity, there may be some inefficiency in having the group scheduled by one Scheduling Entity. In this case, the Group Management Entity may determine that it may be more efficient to split the group along TX Resource pools, and to have a Scheduling Entity perform the resource allocation per subgroup.

Figure 11:
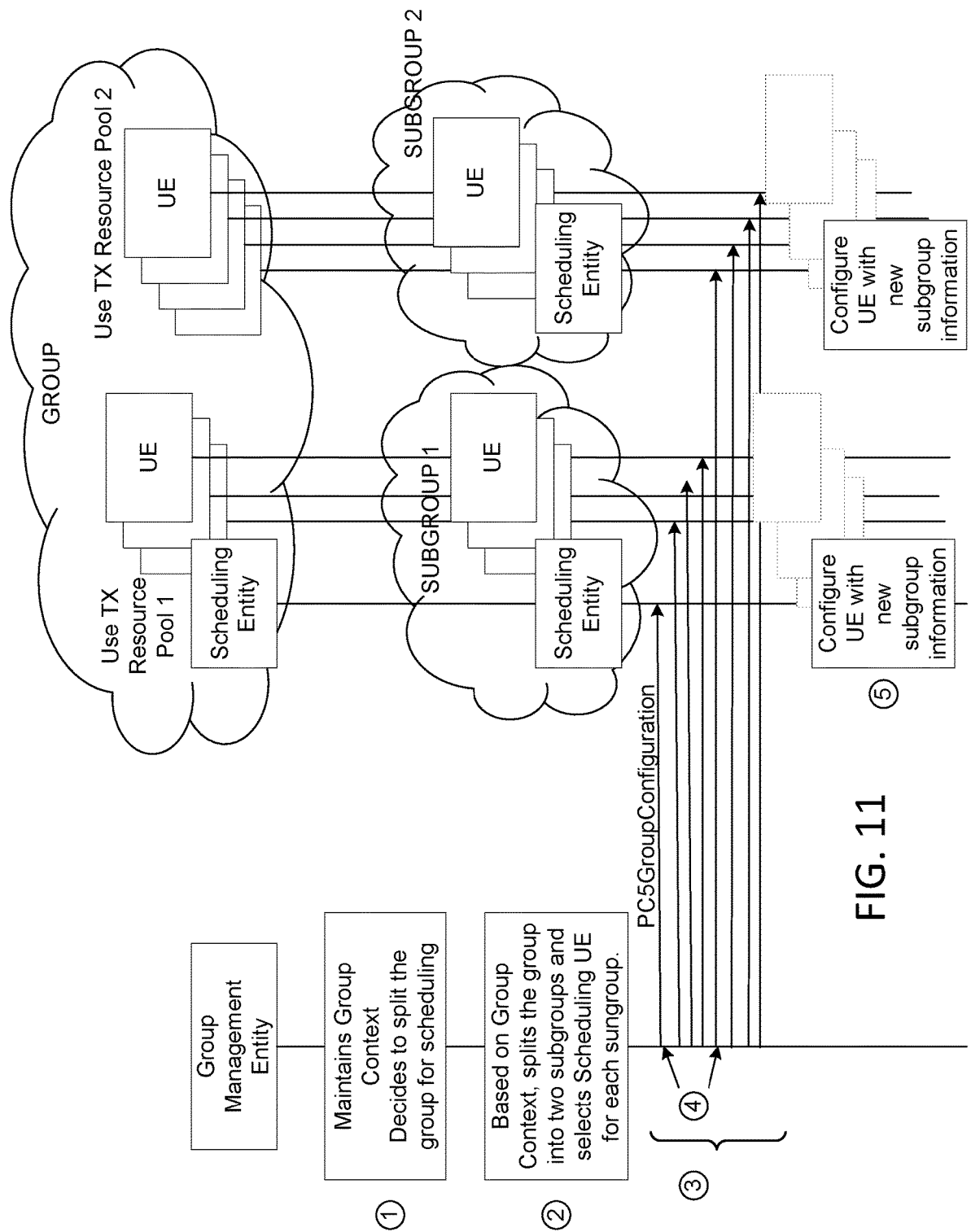
FIG. 11 is a call flow example of splitting group for scheduling efficiency.

FIG. 11 demonstrates splitting group for reason of scheduling efficiency. Note that in FIG. 11, the Group Management Entity is shown outside the group, but it may also be a member of the group. In Step 1 of FIG. 11, Group Management Entity may be monitoring the number of Member UEs using each TX Resource pool. If this number passes a configured threshold, the Group Management Entity may determine that it should split the group into two subgroups, each with its own Scheduling Entity. Alternatively, the decision to split the group for scheduling may come from Upper Layers. The Upper Layer of a Member UE may signal the Group Management Entity to split the group, for example, when some QoS measurement is not being met. In Step 2, Group Management Entity may determine the UE to act as scheduling entity in each of the subgroups. This may be based on the capability of the UE, as may be maintained in the Group Context stored in the Group Management Entity. Next, in Step 3, the group management entity may create two subgroups. It may send a PC5GroupConfiguration message to each of the UEs. Alternatively, this may be a broadcast or groupcast message with the details for all the UEs. In Step 4, Group Management Entity may send scheduling context to each subgroup's scheduling entities. Then, in Step 5, each UE may configure itself for the new subgroup as well as information regarding the scheduling entity per subgroup. Afterwards, in step 6, all scheduling may be done at the subgroup Scheduling Entity.

Sub Group Entity Reorganization. In this use case, it may be assumed that a group has been divided into two subgroups. Each of the sub-groups may have its own Group Management Entity, Scheduling Entity, and/or Controlling Entity. Note that hereafter, it may be assumed that only the group management entity is per sub-group, but it should be understood that this may apply to the case where Scheduling Entity and/or Controlling Entity are per sub-group. For example, this may be the case when a group management entity is collocated with a road-side unit, as shown in FIG. 12.

Figure 12:
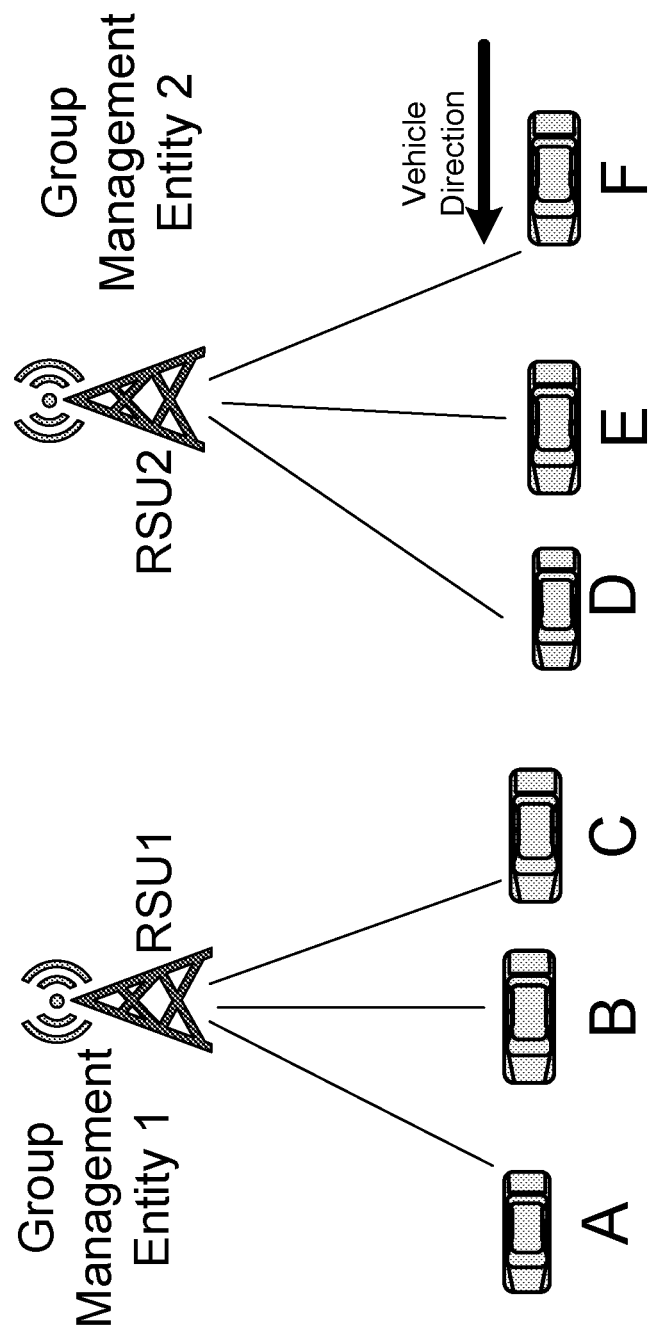
FIG. 12 illustrates a multiple sub-groups use case.
Figure 13:
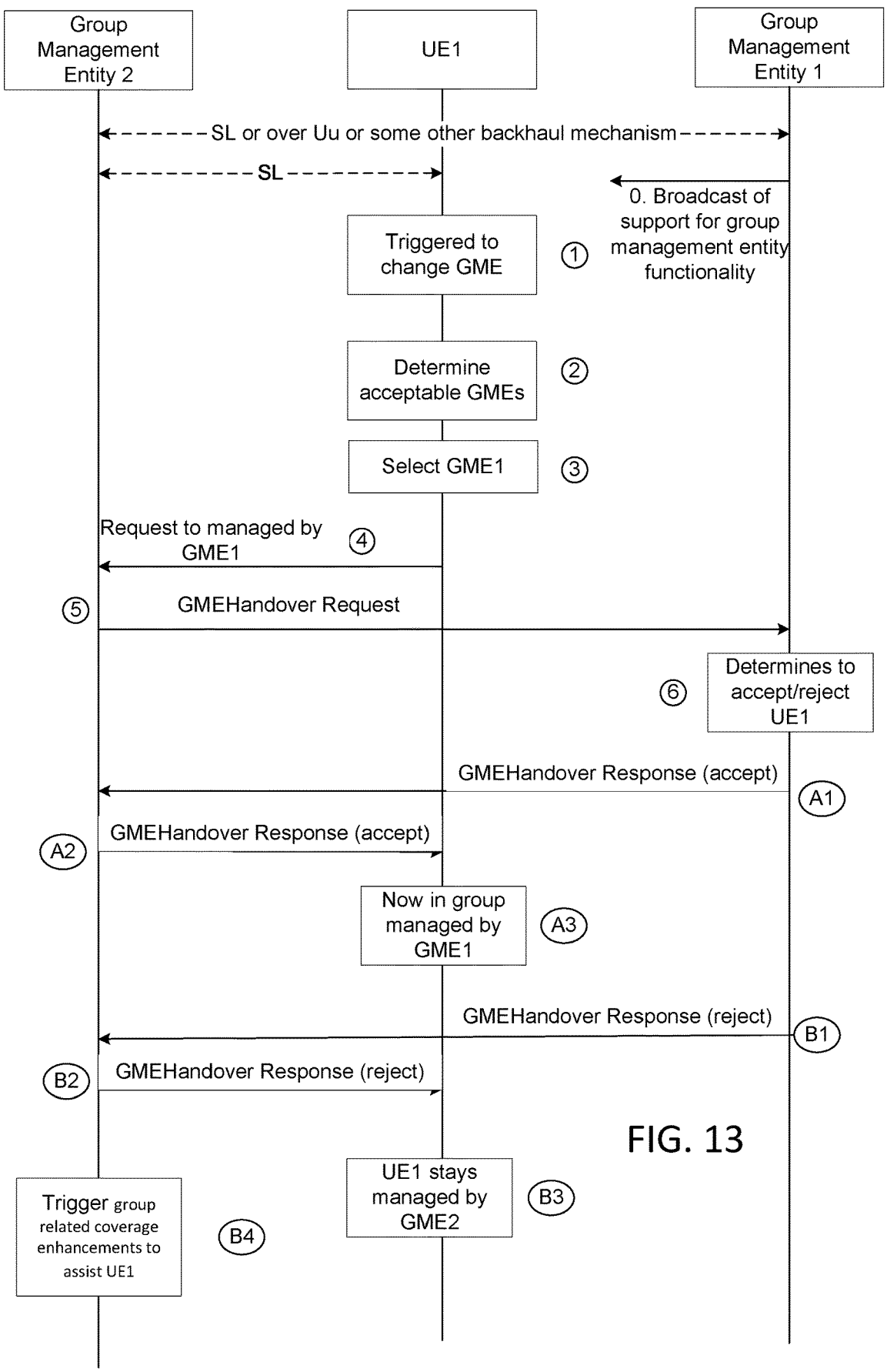
FIG. 13 is a call flow example of sub-group reorganization.

FIG. 12 shows a multiple sub-groups use case. As the vehicles move along the road, they may lose connection to RSU2 and may reconnect to RSU1. In such a case, these vehicles may be better served by the Group management entity in RSU1. The sub-group reorganization call flow is shown in FIG. 13 and described below for the case that a UE (UE1) may change its Group Management entity from GME2 to GME1. Note that GME2 and GME1 may communicate directly over a sidelink, or through some other backhaul mechanism. For example, the group management entities may have Uu connection to the same or different gNB.

FIG. 13 demonstrates a sub-group reorganization. In Step 0, GMEs may broadcast capability to support group management functionality. They may also broadcast the current groups they serve. This may be a group ID, or a service ID. In Step 1, UE1 may be triggered to change Group Management Entity. For example, this may be as a result of an SL connectivity issue to its current Group management entity, a change in UE1 Scheduling Entity, a change in UE1 Controlling Entity, a change in the RSU serving UE1, an indication by its current Group Management Entity (GME2), an indication by its current Scheduling Entity, or an indication by its current Controlling Entity. In Step 2, UE1 may determine acceptable Group Management Entities, from the broadcast information. Alternatively, GME2 may know about nearby group management entities, and may provide this information to UE1. UE1 may then store this information as part of the Group Context it maintains. Next, in Step 3, if a suitable Group Management Entity is found, UE1 may select it. Then, in Step 4, UE1 may signal GME2 that it would like to be part of the group managed by GME1.

Next, in Step 5, GME2 may issue a GMEHandover request to GME1. This request may include one or more of the following:
  resource allocation mode used by UE1, including mode 1, mode 2, or simultaneous mode 1 and Mode 2;
  any configured SPS for UE sidelink transmissions;
  any received measurement results for sidelink transmissions;
  any available scheduling information for UE (e.g., pending SR, BSR reports);
  cast type for each SL RB (unicast, groupcast, broadcast), where, for groupcast, it may provide the size of the group;
  if UE has a special SL role (if UE acts as a Scheduling Entity, Controlling Entity, or Group Management Entity for other sidelink transmissions) it may provide an indication of the number of UEs it may be controlling, scheduling or managing; and
  for each SL RB, the UEs Scheduling Entity, Controlling Entity, or Group Management Entity.

In Step 6, GME1 may determine whether it may be willing to manage UE1. If so, it may update its group context to include UE1 in the following steps A1-A3. In Step A1, GME1 may issue a GMEHandover response to GME2. This response may include one or more of the following:
  A list of IDs of other members in the group that are managed by GME1;
  An SL resource configuration for each SL RB including any new/modified SPS for the SL RB (GME1 may use a different SL resource configuration than that used by GME2);
  For each transferred SL RB, the identity of the UEs new Scheduling Entity, Controlling Entity, or Group Management Entity; and
  For each SL RB, the mechanism to use for resource reselection during the exceptional resource pool phase (e.g., random or scheduled).

In Step A2, GME2 may forward the GMEHandover to UE1. And, in Step A3, UE1 may be now in a group managed by GME1 and may begin using the new SL resource configuration (if any).

If, in Step 6, GME1 determined that it may not be willing to manage UE1, it may proceed with steps B1-B4. In Step B1, GME1 may issue a GMEHandover response to GME2, indicating that it is not willing to include UE1 in the group it is managing. In Step B2, GME2 may forward the GME-Handover response to UE1. In Step B3, UE1 may continue to use GME2 as its Group Management Entity. And, in Step B4, GME2 may rely on some group related coverage enhancements (such as those described in reference to FIG. 10).

(Re)elect new Group Management Entity. In this use case, an SL based Group Management Entity may be replaced. As described, this may occur because the Group Management Entity may be no longer permitted to transmit on the sidelink, or the connection from the Group Management Entity may be lost, or the Group Management Entity may be unable to establish/re-establish connectivity to one or more of the Member UEs.

Figure 14:
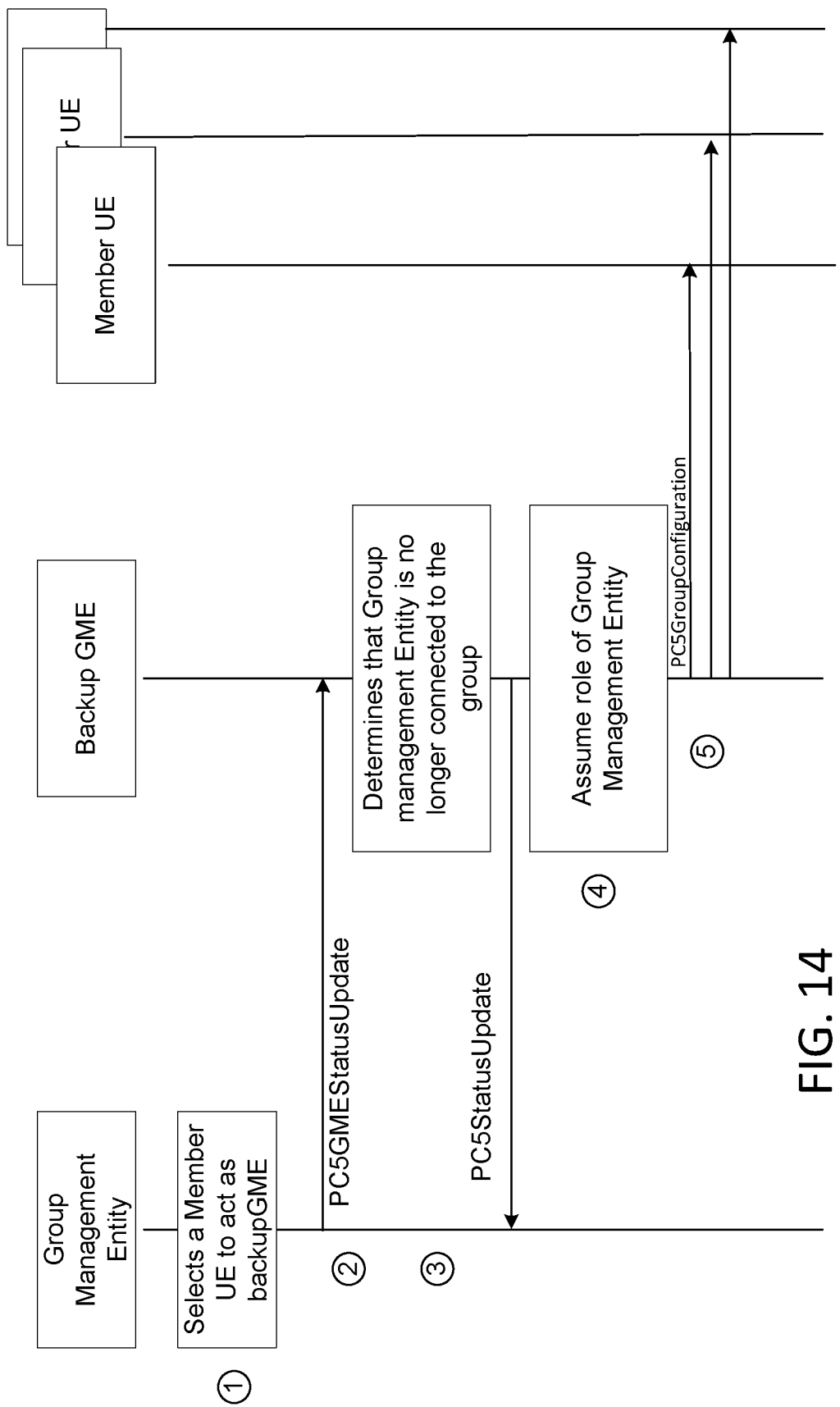
FIG. 14 is a call flow example of election of new group management entity.

FIG. 14 demonstrates election of new Group Management Entity. In Step 1, the Group Management Entity may select a UE to act as backup to manage the group in case of failure. As part of the Group context, the selected UE may have the BackupGME Flag set to TRUE. In Step 2, Group Management Entity may regularly keep the backupGME up to date. It may transfer the group context to the backup on a regular periodic basis, or if there is a change in the group context. The Group Management Entity may send the complete group context, or only the delta since the last update. Alternatively, the backupGME may be configured to regular pull the group context information from the Group Management Entity. The Group Management Entity may use a PC5GMEStatusUpdate message. In Step 3, the backupGME may determine that the Group Management Entity may no longer connected to the group. It may determine this based on missing regular indications from the Group Management Entity (for example the regular updates of Step 2), based on an indication from the scheduling entity that the Group Management Entity has been inactive for a period of time, or based on indications from multiple member UEs that that Group Management Entity has been inactive for an extended period of time. Then, in Step 4, BackupGME may assume the role if Group Management Entity, and in Step 5, BackupGME may notify all group Member UEs about the change in Group Management Entity. This may be through a PC5GroupConfiguration.

(Re)elect new Scheduling Entity. In this use case, an SL based Scheduling Entity may need to be replaced. As described, this may occur because the Scheduling Entity is no longer permitted to transmit on the sidelink, the Scheduling Entity may be no longer willing to act as a scheduler (for example based on a request from its upper layers), or the connection from the Scheduling Entity may be lost. In addition, for some group scenarios where the sidelink service may require scheduled operation, then Scheduling Entity Re-election may also occur when a Scheduling Entity is unable to establish/re-establish connectivity to one or more of the Member UEs.

Figure 15:
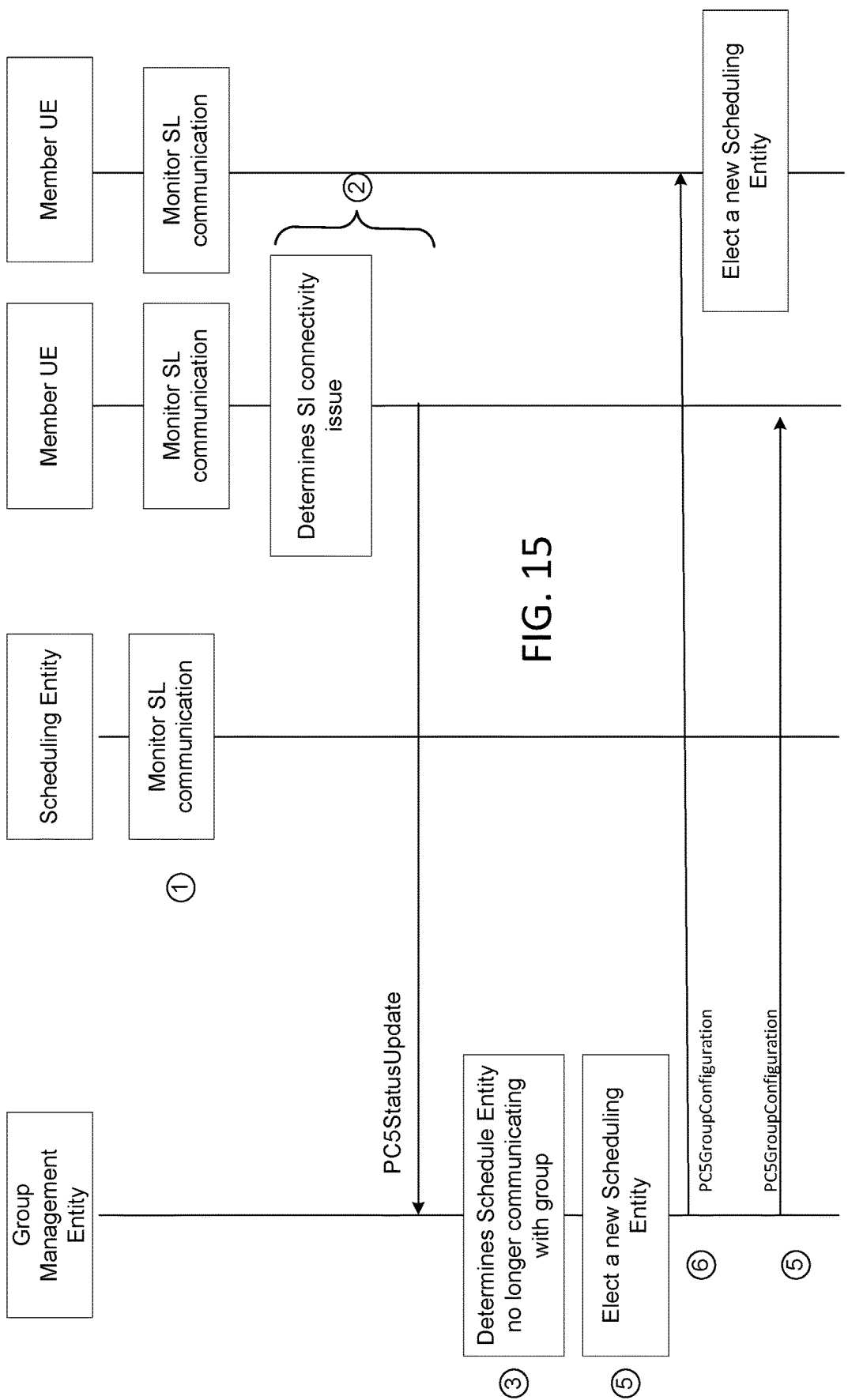
FIG. 15 is a call flow example of election of new scheduling entity.

FIG. 15 demonstrates election of new Scheduling Entity. In Step 0, Member UEs (UE1, UE2, UEk) may be communicating over sidelink. The Group Management Entity may be aware of the Member UE that is acting as Scheduling Entity for the group. The Group Management Entity may be also aware of all the Member UEs that are willing/capable of acting as Scheduler UEs. In Step 1, UEs may monitor their SL connectivity. Then, in Step 2, upon detection of an SL connectivity issue, a UE may notify Group Management Entity. For example, this may be using a message PC5StatusUpdate. Potential contents of the PC5StatusUpdate are shown in Table 7.

Step 3: The Group Management Entity may determine that the Scheduling Entity may no longer providing service to the group. It may determine this based on, for example, sidelink radio link monitoring between itself and the Scheduling Entity, a status message from the Sidelink Entity (e.g. PC5StatusUpdate), or status messages from one or more the Member UEs (e.g PC5StatusUpdate). The Group Management Entity may use the sidelink status information contained in the message to determine if a new Scheduling Entity has to be elected. For example, a Group Management Entity may decide to elect a new Scheduling Entity if PC5StatusUpdate from the Scheduling Entity shows a connectivity issue with most or all of the sidelinks from the Scheduling Entity. Similarly, a Group Management Entity may decide to elect a new Scheduling Entity if PC5StatusUpdate from a Member UE continually shows a connectivity issue with the Scheduling Entity, even after the Group Management Entity has tried to recover from this issue.

In Step 4, Group Management Entity may use the group context to elect a new Scheduling Entity. In Step 5, Group Management Entity may inform the Member UE that it is the new Scheduling Entity. It may provide a Scheduling context that it has available, for example, if a Member UE has configured SPS (e.g., PC5GroupConfiguration). Next, in Step 6, Group Management Entity may inform the other group Member UEs about the identity of the new Scheduling Entity (e.g. PC5GroupConfiguration). And, in Step 7, the group may start to use the new Scheduling Entity.

Group Management Entity Determines Optimum TX Resource Pool. Owing to mobility, a Member UE may change its TX Resource Pool as it, for example, changes serving cell, changes from in-coverage to out-of-coverage (or vice-versa), or changes its RRC state. In such cases, the TX Resource pool for the Member UE may be different from that of the other group members, the Scheduling Entity, and/or the Group Management Entity. As described, use of different TX resource pools amongst the members of a group may lead to inefficiencies, especially if the group members may be required to use mode 2(d) scheduled resource allocation mode. To counter these inefficiencies, the Group Management Entity may determine a 'common TX resource pool.' This common TX resource pool may contain only the resource that are common to all members of the group (including potentially the SL based Scheduling Entity and the SL based Group Management Entity). The overall procedure may be defined in the following steps.

Step 1: Member UE may change its TX Resource pool. Member UE may update the Group Management Entity with its latest TX Resource pool.

Step 2: Group Management Entity may evaluate the need for an optimized TX Resource Pool and, thus, may determine the common TX resource pool.

Step 3: Group Management Entity may update all group members (and potentially the Scheduling Entity) with the new TX resource pool.

Signaling Message Contents

Message Exchanges. Table 7 shows PC5StatusUpdate. Direction: UE to Group Management Entity and Link: PC5 or Uu.

TABLE 7

PC5StatusUpdate

| | |
|---|---|
| Member UE ID | identity of the Member UE sending the update |
| Cause | loss of connectivity, change in RRC state, change in coverage (in coverage to out of coverage or out of coverage to in coverage), change in serving cell, change in TX resource pool, change in RX resource pool |
| | loss of connectivity |
| Problem sidelinks | identity of destination Member UE for which loss of connectivity is being reported |
| Good sidelinks | identity of destination Member UEs for which this reporting UE has good connectivity. |
| | change in RRC state |
| New UE State | RRC CONNECTED, RRC IDLE, RRC INACTIVE |
| | change in coverage |
| New coverage state | In-coverage, out-of-coverage |
| | change in serving cell |
| New Service Cell | Cell ID |
| | change in TX resource pool |
| New Tx Resource Pool List | List of SL-CommTXResourcePool |
| | change in RX resource pool |
| New RX Resource Pool List | List of SL-CommRXResourcePool |

Table 8 shows PC5GroupConfiguration. Direction: Group Management Entity to UE and Link: PC5 or Uu.

TABLE 8

PC5GroupConfiguration

| | |
|---|---|
| Member UE ID | identity of the Member UE being configured |
| Subgroup List | List of subgroups for which the Member UE belongs |
| Relay UE | Indication to have Member UE act as a relay |
| RelayForList | List of Member UE IDs, for which this UE may act as a relay. Upon reception of traffic with destination ID matching an ID on this list, the UE will relay the traffic. |
| Required Resource Allocation Mode | Non-Scheduled, Scheduled |
| Assigned Resource Allocation Mode | Non-scheduled: mode 2(a), Scheduled: mode 1, mode 2(d) |

What is claimed is:

1. An apparatus comprising a processor and memory, the memory storing instructions that, when executed by the processor, cause the apparatus to perform operations, associated with a source cell of a communication network, comprising:
  receiving, from a first user equipment (UE), a measurement report comprising an indication that a target cell of the communications network is better than the source cell;
  determining, based on the measurement report, to perform a handover of the first UE to the target cell;
  sending, to the target cell, a handover request comprising sidelink communication requirements between the first UE and a second UE in communication with the first UE;
  receiving, from the target cell, a handover response to the handover request, wherein the handover response comprises sidelink configuration information associated with the target cell, wherein the sidelink configuration information includes a configuration of an exceptional resource pool of the target cell for sidelink communication during handover, wherein the configuration of the exceptional resource pool is divided into priority based sub-pools;
  sending, to the first UE, the handover response to facilitate handover of the first UE from the source cell to the target cell.

2. The apparatus of claim 1, wherein the sidelink communication requirements between the first UE and the second UE comprises one or more of a resource allocation mode of the first UE, a cast type of each sidelink radio bearer, an indication if a sidelink radio bearer should be transferred to the target cell, a scheduling entity of the first UE, a controlling entity of the first UE, a group management entity of the first UE, an indication whether the first UE has a special role as a scheduling entity, a controlling entity, or a group management entity.

3. The apparatus of claim 1, wherein the sidelink configuration information associated with the target cell comprises one or more of a list of sidelink radio bearers to be transferred to target cell, a list of sidelink radio bearers to be dropped, a new scheduling entity for the first UE, a new controlling entity for the first UE, or a new group management entity for the first UE.

4. The apparatus of claim 3, wherein the sending, to the first UE, the handover response with the exceptional resource pool, causes the first UE to initiate sidelink communication of a given priority level using only sub-pools of equal or lower priority.

5. The apparatus of claim 1, wherein the sending, to the first UE, the handover response triggers the first UE to detach from the source cell, to begin synchronization with the target cell, and to reconfigure according to the sidelink configuration information.

6. The apparatus of claim 1, wherein the instructions, when executed by the processor, further cause the apparatus to perform operations comprising:
  retrieving, from a scheduling entity associated with the first UE, a scheduling context associated with the first UE; and
  sending, to the target cell, the scheduling context associated with the first UE, wherein the scheduling context facilitates scheduling, by a new scheduling entity, of resources associated with the first UE.

7. The apparatus of claim 6, wherein the scheduling context comprises one or more of an active configured grant assigned to the first UE, a pending buffer status report received from the first UE, a pending scheduling request received from first UE, or sidelink related measurements received from the first UE.

8. The apparatus of claim 6, wherein the new scheduling entity is hosted by the target cell or by another UE served by the target cell.

9. The apparatus of claim 6, wherein the retrieving the scheduling context associated with the first UE, triggers the scheduling entity to stop resource scheduling for the first UE and to release configured grant resources allocated to the first UE.

10. The apparatus of claim 6, wherein the retrieving the scheduling context associated with the first UE, triggers the scheduling entity to maintain the retrieved scheduling context for a period of time and to remove the scheduling context after the time period expires.

\* \* \* \* \*